(12) United States Patent
Tannenbaum et al.

(10) Patent No.: US 11,734,345 B2
(45) Date of Patent: *Aug. 22, 2023

(54) SYSTEMS AND METHODS FOR MONITORING OBJECTS AND THEIR STATES BY USING ACOUSTIC SIGNALS

(71) Applicant: Google LLC, Mountain View, CA (US)

(72) Inventors: Harry Tannenbaum, San Francisco, CA (US); Benjamin Irvine, San Francisco, CA (US); Shayan Sayadi, San Francisco, CA (US); James Van Hook Singer, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/523,647

(22) Filed: Nov. 10, 2021

(65) Prior Publication Data
US 2022/0067089 A1    Mar. 3, 2022

Related U.S. Application Data

(63) Continuation of application No. 16/252,509, filed on Jan. 18, 2019, now Pat. No. 11,200,277, which is a
(Continued)

(51) Int. Cl.
*G06F 17/30* (2006.01)
*G06F 16/68* (2019.01)
*G06F 16/61* (2019.01)

(52) U.S. Cl.
CPC .......... *G06F 16/686* (2019.01); *G06F 16/61* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS 8,059,489 B1 * 11/2011 Lee .................. G01N 29/46
367/136
8,140,656 B2    3/2012 Chen
(Continued)

OTHER PUBLICATIONS

"Non-Final Office Action", U.S. Appl. No. 16/252,509, filed May 7, 2021, 5 pages.
(Continued)

*Primary Examiner* — Hung D Le
(74) *Attorney, Agent, or Firm* — Colby Nipper PLLC

(57) ABSTRACT

The various implementations disclosed herein pertain to methods and systems for detecting a state of monitored objects in a premises. In one aspect, a method is performed at a computer system that is communicably coupled to sensor devices. The computer system receives and processes information of acoustic signals against a database of stored acoustic signatures characterizing predefined acoustic signals generated by electrically non-powered passive tags in response to physical motion of respective monitored objects associated with the passive tags. It receives a first acoustic signal characterized by a first acoustic signature and generated by a first passive tag. In response to the receiving, based on the first acoustic signature and information in the database, it identifies the first monitored object associated with the first acoustic signature, determines a first state of the first monitored object, and provides a notification of the first state to an occupant of the premises.

20 Claims, 20 Drawing Sheets

Related U.S. Application Data continuation of application No. 14/997,456, filed on Jan. 15, 2016, now Pat. No. 10,185,766.

(56) References Cited

U.S. PATENT DOCUMENTS

| | | | |
|---|---|---|---|
| 8,954,135 B2* | 2/2015 | Yuen | A61B 5/6898 600/407 |
| 9,001,082 B1 | 4/2015 | Rosenberg et al. | |
| 9,063,930 B2* | 6/2015 | Zadeh | G06V 10/443 |
| 10,185,766 B2 | 1/2019 | Tannenbaum et al. | |
| 11,200,277 B2 | 12/2021 | Tannenbaum et al. | |
| 2002/0169583 A1* | 11/2002 | Gutta | G08B 21/0476 702/188 |
| 2002/0171551 A1* | 11/2002 | Eshelman | A61B 5/7267 340/573.1 |
| 2003/0142847 A1* | 7/2003 | Rhoads | G07F 7/12 704/E19.009 |
| 2006/0064037 A1* | 3/2006 | Shalon | G16H 20/60 128/903 |
| 2013/0127980 A1* | 5/2013 | Haddick | G06F 3/013 348/14.08 |
| 2014/0149529 A1* | 5/2014 | McLellan | H04W 4/80 709/213 |
| 2014/0307878 A1* | 10/2014 | Osborne | G10H 1/0008 381/56 |
| 2015/0372954 A1* | 12/2015 | Dubman | H04L 43/04 709/206 |
| 2016/0084869 A1* | 3/2016 | Yuen | A63B 60/46 73/510 |
| 2017/0000391 A1* | 1/2017 | Wasson | A61B 5/14532 |
| 2017/0374437 A1 | 12/2017 | Schwarzkopf et al. | |

OTHER PUBLICATIONS

"Notice of Allowance", U.S. Appl. No. 16/252,509, filed Aug. 20, 2021, 9 pages.

\* cited by examiner

| # | Object ID | Object Type | Location | Corresp. State | Current State | Signature Characteristics ||||| 
|---|---|---|---|---|---|---|---|---|---|---|
| | | | | | | Length | Amplitude (e.g., Pressure) | Spectral Coefficients (Fourier Transform of a(t)) | Ref. Distance | Ref. Sensor |
| 1 | 1002-1 | Window | Room 1000-1 | Open | Open | $L_1$ | $a_1(t)$ | $F_1(\omega)$ | $d_1$ | Plug 110 |
| 2 | 1002-1 | Window | Room 1000-1 | Closed | Open | $L_2$ | $a_2(t)$ | $F_2(\omega)$ | $d_1$ | Plug 110 |
| 3 | 1004 | Door | Room 1000-1 | Open | Closed | $L_3$ | $a_3(t)$ | $F_3(\omega)$ | $d_2$ | Camera 118 |
| 4 | 1004 | Door | Room 1000-1 | Closed | Closed | $L_4$ | $a_4(t)$ | $F_4(\omega)$ | $d_2$ | Camera 118 |
| 5 | 1002-2 | Window | Room 1000-2 | Toggle | Closed | $L_5$ | $a_5(t)$ | $F_5(\omega)$ | $d_3$ | Thermostat 102 |
| ... | ... | ... | ... | ... | ... | ... | ... | ... | ... | ... |

| # | Device Type | Model | Instructions | Signature Characteristics | | |
|---|---|---|---|---|---|---|
| | | | | Length | Amplitude (e.g., Pressure) | Spectral Coefficients (Fourier Transform of a(t)) |
| 1 | Camera | Mfr. A Model A | Register device with home system | $L_1$ | $a_1(t)$ | $F_1(\omega)$ |
| 2 | Camera | Mfr. B Model X | Register device with home system | $L_1$ | $a_2(t)$ | $F_2(\omega)$ |
| 3 | Thermostat | Mfr. A Model C | Commence pairing operation | $L_2$ | $a_3(t)$ | $F_3(\omega)$ |
| 4 | Hazard Detector | Mfr. C Model F | Determine whether SW/FW update needed | $L_3$ | $a_4(t)$ | $F_4(\omega)$ |
| 5 | Smart Plug | Mfr. C Model D | Commence software installation | $L_4$ | $a_5(t)$ | $F_5(\omega)$ |
| ... | ... | ... | ... | ... | ... | ... |

```
┌─────────────────────────────────────────────────────────────────────┐
│ At a computer system having one or more processors and memory storing instructions │
│ for execution by the one or more processors, wherein the computer system is        │──1302
│ communicably coupled to one or more sensor devices:                                │
└─────────────────────────────────────────────────────────────────────┘
```

Obtain a database of stored acoustic signatures characterizing predefined acoustic signals generated by passive tags in response to physical motion of respective monitored objects associated with the passive tags ──1304

A first one of the passive tags comprises a material configured to generate a first acoustic signal in response to physical contact when physically moved in a predetermined manner ──1306

At least some of the respective monitored objects associated with the passive tags are entryways of a premises ──1308

Acoustic signatures, which include the stored acoustic signatures in the database and a respective acoustic signature of a first acoustic signal, are respectively defined by one or more characteristics of acoustic signatures. The characteristics include at least one of an acoustic signature length, one or more amplitude values, and one or more spectral coefficients for one or more respective frequencies. ──1310

Each or any combination of the one or more characteristics respectively defining the stored acoustic signatures is associated with: a respective object, a type of object, a state or change of state for a respective object, a state or change of state for a respective type of object, and/or a location. ──1312

Detect the first acoustic signal characterized by the respective acoustic signature and generated by the first passive tag ──1314

```
┌─────────────────────────────────────────────────────────────────────────┐
│ At a computer system having one or more processors and memory storing   │
│ instructions for execution by the one or more processors, wherein the   │──1402
│ computer system is communicably coupled to one or more sensor devices:  │
└─────────────────────────────────────────────────────────────────────────┘
                                    │
                                    ▼
┌─────────────────────────────────────────────────────────────────────────┐
│ Obtain a database of stored acoustic signatures characterizing          │
│ predefined acoustic signals generated by passive tags in response to    │
│ physical motion of the passive tags. The passive tags are associated    │──1404
│ with non-provisioned devices, and the acoustic signatures are           │
│ associated with respective sets of executable instructions for          │
│ provisioning the non-provisioned devices.                               │
│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐   │
│    Provisioning comprises pairing or associating an online user         │
│  │ account with a respective identifier of a first one of the        │──1406
│    non-provisioned devices                                              │
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘   │
│                                                                         │
│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐   │
│  │ The first passive tag is a component of a packaging associated   │──1408
│    with the first non-provisioned device                                │
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘   │
│                                                                         │
│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐   │
│  │ Acoustic signatures, which include the stored acoustic            │
│    signatures in the database and a respective acoustic signature       │
│  │ of a first acoustic signal, are respectively defined by one or    │──1410
│    more characteristics of acoustic signatures. The characteristics     │
│  │ include at least one of an acoustic signature length, one or      │
│    more amplitude values, and one or more spectral coefficients         │
│  │ for one or more respective frequencies.                           │   │
│    ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐       │
│  │ │ Each or any combination of the one or more characteristics │    │
│      respectively defining the stored acoustic signatures is         ──1412
│  │ │ associated with: a device type and/or a respective set of  │    │
│      executable instructions                                         │
│  │ └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘   │   │
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘   │
└─────────────────────────────────────────────────────────────────────────┘
                                    │
                                    ▼
┌─────────────────────────────────────────────────────────────────────────┐
│ Detect a first acoustic signal characterized by a respective acoustic   │──1414
│ signature and generated by a first one of the passive tags              │
└─────────────────────────────────────────────────────────────────────────┘
                                    │
                                    ▼
```

Figure 14A

SYSTEMS AND METHODS FOR MONITORING OBJECTS AND THEIR STATES BY USING ACOUSTIC SIGNALS

RELATED APPLICATIONS

This application is a continuation of and claims priority to U.S. patent application Ser. No. 16/252,509, filed on Jan. 18, 2019, titled "Systems and Methods for Monitoring Objects and their States by Using Acoustic Signals," which in turn is a continuation of and claims priority to U.S. patent application Ser. No. 14/997,456, filed on Jan. 15, 2016, titled "Systems and Methods for Monitoring Objects and Their States by Using Acoustic Signals," which is hereby incorporated by reference in its entirety.

The present application is related to U.S. patent application Ser. No. 14/997,440, filed on Jan. 15, 2016, titled "Systems and Methods for Provisioning Devices Using Acoustic Signals," which is hereby incorporated by reference in its entirety.

TECHNICAL FIELD

This relates generally to sensor devices, including but not limited to methods and systems for using acoustic signals to monitor objects and provision devices.

BACKGROUND

The number of electronic devices typically present in an environment at any given time has increased dramatically. At the same time, these same devices continue to be improved upon with respect to sensor capabilities, usability, and advanced features.

Despite such advancements, these devices are often times limited to the functionalities that they are individually configured to perform. Even when devices can be configured together, set up frequently requires significant user intervention and interaction. Consequently, the breadth of sensor capabilities available in any given environment is typically underutilized for performing basic or advanced tasks with respect to the device environment.

SUMMARY

Accordingly, there is a need for methods, devices, and systems for monitoring objects and provisioning devices by detecting and analyzing acoustic signals generated by passive tags. In various implementations, the disclosed functionality complements or replaces the functionality of security systems, connected home device networks, and systems for provisioning devices.

In some implementations, a method is performed at a computer system (e.g., a smart device) having one or more processors and memory storing instructions for execution by the one or more processors, wherein the computer system is communicably coupled to one or more sensor devices. The method includes obtaining a database of stored acoustic signatures characterizing predefined acoustic signals generated by passive tags in response to physical motion of respective monitored objects associated with the passive tags. A first acoustic signal characterized by a respective acoustic signature and generated by a first one of the passive tags is detected. In response to the detecting, and based on the respective acoustic signature and information in the database, a first monitored object associated with the respective acoustic signature is identified, and a first state of the first monitored object is determined. The determined first state of the first monitored object is stored in the database, and an indication of the first state of the first monitored object is provided to a monitoring service associated with the one or more monitored objects. Various combinations of detected devices and states could trigger alerts or actions for an end user or system.

In some implementations, at least a part of a method is performed at a sensor device (e.g., a smart device) having one or more first processors and first memory storing instructions for execution by the one or more first processors, wherein sensor device is communicably coupled to a remote server (e.g., a cloud-computing system). The sensor device detects a first acoustic signal characterized by a respective acoustic signature and generated by a first one of a plurality of passive tags. Furthermore, at least a part of the method is performed at the remote server having one or more second processors and second memory storing instructions for execution by the one or more second processors. The remote server obtains a database of stored acoustic signatures characterizing predefined acoustic signals generated by the plurality of passive tags in response to physical motion of respective monitored objects associated with the plurality of passive tags. In response to the detection of the first acoustic signal by the sensor device, and based on the respective acoustic signature and information in the database, the remote server identifies a first monitored object associated with the respective acoustic signature, and determines a first state of the first monitored object. The determined first state of the first monitored object is stored in the database, and an indication of the first state of the first monitored object is provided to a monitoring service associated with the one or more monitored objects.

In another aspect, a method is performed at a computer system (e.g., a smart device) having one or more processors and memory storing instructions for execution by the one or more processors, wherein the computer system is communicably coupled to one or more sensor devices. The method includes obtaining a database of stored acoustic signatures characterizing predefined acoustic signals generated by passive tags in response to physical motion of the passive tags, wherein the passive tags are associated with non-provisioned devices, and wherein the acoustic signatures are associated with respective sets of executable instructions for provisioning the non-provisioned devices. A first acoustic signal characterized by a respective acoustic signature and generated by a first one of the passive tags is detected. In response to the detecting, and based on the respective acoustic signature and information in the database, a first one of the non-provisioned devices associated with the respective acoustic signature is identified, and a first one of the respective sets of executable instructions for provisioning the first non-provisioned device is identified. After, the computer system causes execution of the first set of executable instructions, thereby causing to commence a software process for provisioning the first non-provisioned device.

In accordance with some implementations, a computer system (e.g., a smart device) includes one or more processors, memory, and one or more programs; the one or more programs are stored in the memory and configured to be executed by the one or more processors. The one or more programs include instructions for performing the operations of any of the methods described above. In accordance with some implementations, a non-transitory computer-readable storage medium has stored therein instructions that, when executed by the computer system, cause the computer system to perform the operations of any of the methods described above.

Thus, computing systems and devices are provided with more efficient methods for monitoring objects and provisioning devices in an environment. These disclosed systems and devices thereby increase the effectiveness, efficiency, and user satisfaction with such systems and devices.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIG. 11B illustrates a table of acoustic signatures, in accordance with some implementations.

FIG. 12B illustrates a table of acoustic signatures, in accordance with some implementations.

FIGS. 13A-13C illustrate a flowchart representation of a method of identifying a monitored object and determining its state, in accordance with some implementations.

FIGS. 14A-14C illustrate a flowchart representation of a method of identifying a non-provisioned device and a set of executable instructions for provisioning the non-provisioned device, in accordance with some implementations.

Like reference numerals refer to corresponding parts throughout the several views of the drawings.

DETAILED DESCRIPTION

Figure 1:
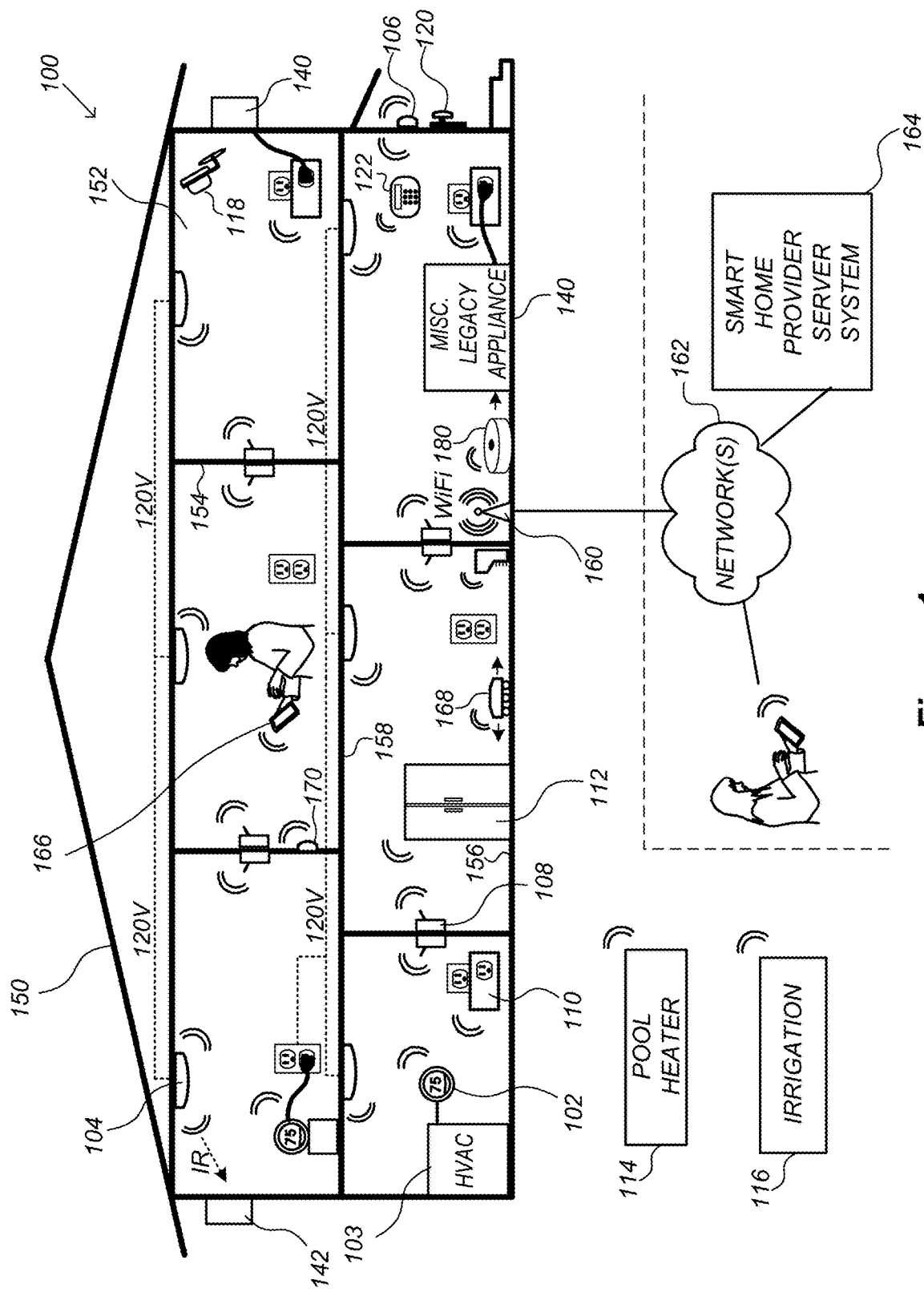
FIG. 1 is a representative smart home environment in accordance with some implementations.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first acoustic signal could be termed a second acoustic signal, and, similarly, a second acoustic signal could be termed a first acoustic signal, without departing from the scope of the various described implementations. The first acoustic signal and the second acoustic signal are both acoustic signals, but they are not the same acoustic signal.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

FIG. 1 is an example smart home environment 100 in accordance with some implementations. Smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. Further, the smart home environment 100 may control and/or be coupled to devices outside of the actual structure 150. Indeed, several devices in the smart home environment 100 need not be physically within the structure 150. For example, a device controlling a pool heater 114 or irrigation system 116 may be located outside of the structure 150.

The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with and/or supported by a wall 154, floor 156 or ceiling 158.

In some implementations, the integrated devices of the smart home environment 100 include intelligent, multi-sensing, network-connected devices that integrate seamlessly with each other in a smart home network (e.g., 202 FIG. 2) and/or with a central server or a cloud-computing system to provide a variety of useful smart home functions (collectively referred to as "smart devices"). The smart home environment 100 may include one or more smart devices, such as one or more intelligent, multi-sensing, network-connected: thermostats 102 (hereinafter referred to as "smart thermostats 102"), hazard detection units 104 (hereinafter referred to as "smart hazard detectors 104"), entryway interface devices 106 and 120 (hereinafter referred to as "smart doorbells 106" and "smart door locks 120"), alarm systems 122 (hereinafter referred to as "smart alarm systems 122"), wall switches 108 (hereinafter referred to as "smart wall switches 108"), wall plugs 110 (hereinafter referred to as "smart wall plugs 110"), appliances 112 (hereinafter referred to as "smart appliances 112"), cameras 118, and hub devices 180. In some implementations, smart devices in the smart home environment 100 are configured with one or more acoustic sensors (e.g., microphones) for detecting acoustic signals (e.g., acoustic signal 1006-1 generated by tags 1010-1 through 1010-4 in response to physical motion, FIG. 11A; ambient noise; user voices; etc.), and outputting signals (e.g., voltage, current) representing the detected acoustic signals.

In some implementations, the one or more smart thermostats 102 detect ambient climate characteristics (e.g., temperature and/or humidity) and control a HVAC system 103 accordingly. For example, a respective smart thermostat 102 includes an ambient temperature sensor.

The one or more smart hazard detectors 104 may include thermal radiation sensors directed at respective heat sources (e.g., a stove, oven, other appliances, a fireplace, etc.). For example, a smart hazard detector 104 in a kitchen 153 includes a thermal radiation sensor directed at a stove/oven 112. A thermal radiation sensor may determine the temperature of the respective heat source (or a portion thereof) at which it is directed and may provide corresponding black-body radiation data as output.

The smart doorbell 106 and/or the smart door lock 120 may detect a person's approach to or departure from a location (e.g., an outer door), control doorbell/door locking functionality (e.g., receive user inputs from a portable electronic device 166-1 to actuate bolt of the smart door lock 120), announce a person's approach or departure via audio or visual means, and/or control settings on a security system (e.g., to activate or deactivate the security system when occupants go and come).

The smart alarm system 122 may detect the presence of an individual within close proximity (e.g., using built-in IR sensors), sound an alarm (e.g., through a built-in speaker, or by sending commands to one or more external speakers), and send notifications to entities or users within/outside of the smart home network 100. In some implementations, the smart alarm system 122 also includes one or more input devices or sensors (e.g., keypad, biometric scanner, NFC transceiver, microphone) for verifying the identity of a user, and one or more output devices (e.g., display, speaker). In some implementations, the smart alarm system 122 may also be set to an "armed" mode, such that detection of a trigger condition or event causes the alarm to be sounded unless a disarming action is performed.

In some implementations, the smart home environment 100 includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. Smart wall plugs 110 control supply of power to one or more coupled devices. Smart wall plugs 110 control access to power based on sensor readings (e.g., power is not supplied to a coupled device if no users are present, based on a detected occupancy of a room) or remote control inputs (e.g., inputs received from a client device 504).

In some implementations, the smart home environment 100 of FIG. 1 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some implementations, the smart home environment 100 includes one or more network-connected cameras 118 that are configured to provide video monitoring and security in the smart home environment 100. The cameras 118 may be used to determine occupancy of the structure 150 and/or particular rooms 152 in the structure 150, and thus may act as occupancy sensors. For example, video captured by the cameras 118 may be processed to identify the presence of an occupant in the structure 150 (e.g., in a particular room 152). Specific individuals may be identified based, for example, on their appearance (e.g., height, face) and/or movement (e.g., their walk/gait). Cameras 118 may additionally include one or more sensors (e.g., IR sensors, motion detectors), input devices (e.g., microphone for capturing audio), and output devices (e.g., speaker for outputting audio).

The smart home environment 100 may additionally or alternatively include one or more devices having an occupancy sensor (e.g., the smart doorbell 106, smart door locks 120, touch screens, IR sensors, microphones, ambient light sensors, motion detectors, smart nightlights 170, etc.). In some implementations, the smart home environment 100 includes radio-frequency identification (RFID) readers (e.g., in each room 152 or a portion thereof) that determine occupancy based on RFID tags located on or embedded in occupants. For example, RFID readers may be integrated into the smart hazard detectors 104.

The smart home environment 100 may also include communication with devices outside of the physical home but within a proximate geographical range of the home. For example, the smart home environment 100 may include a pool heater monitor 114 that communicates a current pool temperature to other devices within the smart home environment 100 and/or receives commands for controlling the pool temperature. Similarly, the smart home environment 100 may include an irrigation monitor 116 that communicates information regarding irrigation systems within the smart home environment 100 and/or receives control information for controlling such irrigation systems.

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device 166 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 100 using a network-connected computer or portable electronic device 166. In some examples, some or all of the occupants (e.g., individuals who live in the home) may register their device 166 with the smart home environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart home environment 100 may make inferences about which individuals live in the home and are therefore occupants and which devices 166 are associated with those individuals. As such, the smart home environment may "learn" who is an occupant and permit the devices 166 associated with those individuals to control the smart devices of the home.

In some implementations, in addition to containing processing and sensing capabilities, devices 102, 104, 106, 108, 110, 112, 114, 116, 118, 120, and/or 122 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, data communications are conducted peer-to-peer (e.g., by establishing direct wireless communications channels between devices). In some implementations, the smart devices serve as wireless or wired repeaters. In some implementations, a first one of the smart devices communicates with a second one of the smart devices via a wireless router. The smart devices may further communicate with each other via a connection (e.g., network interface 160) to a network, such as the Internet 162. Through the Internet 162, the smart devices may communicate with a smart home provider server system 164 (also called a central server system and/or a cloud-computing system herein). The smart home provider server system 164 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from the smart home provider server system 164 to smart devices (e.g., when available, when purchased, or at routine intervals).

In some implementations, the smart home environment 100 of FIG. 1 includes a hub device 180 that is communicatively coupled to the network(s) 162 directly or via the network interface 160. The hub device 180 is further communicatively coupled to one or more of the above intelligent, multi-sensing, network-connected devices (e.g., smart devices of the smart home environment 100). Each of these smart devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device.

In some implementations, a user of such controller application can view status of the hub device or coupled smart devices, configure the hub device to interoperate with smart devices newly introduced to the home network, commission new smart devices, and adjust or view settings of connected smart devices, etc. In some implementations the hub device extends capabilities of low capability smart device to match capabilities of the highly capable smart devices of the same type, integrates functionality of multiple different device types—even across different communication protocols, and is configured to streamline adding of new devices and commissioning of the hub device.

Figure 2:
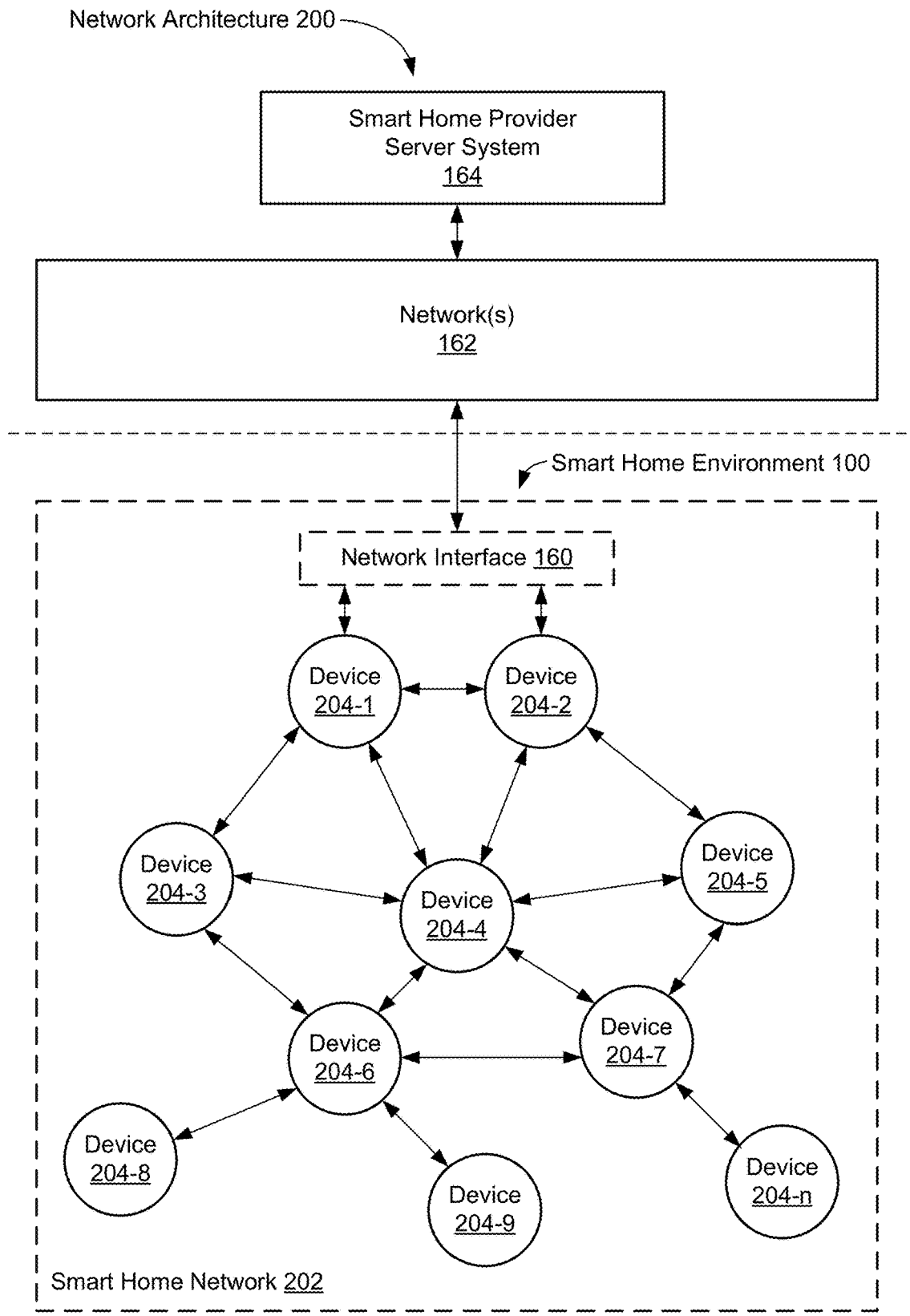
FIG. 2 is a block diagram illustrating a representative network architecture that includes a smart home network in accordance with some implementations.

FIG. 2 is a block diagram illustrating a representative network architecture 200 that includes a smart home network 202 in accordance with some implementations. In some implementations, one or more smart devices 204 in the smart home environment 100 (e.g., the devices 102, 104, 106, 108, 110, 112, 114, 116, 118, 180, and/or 122) combine to create a mesh network in the smart home network 202. In some implementations, the one or more smart devices 204 in the smart home network 202 operate as a smart home controller. In some implementations, a smart home controller has more computing power than other smart devices. In some implementations, a smart home controller processes inputs (e.g., from the smart device(s) 204, the electronic device 166, and/or the smart home provider server system 164) and sends commands (e.g., to the smart device(s) 204 in the smart home network 202) to control operation of the smart home environment 100. In some implementations, some of the smart device(s) 204 in the mesh network are "spokesman" nodes (e.g., node 204-1) and others are "low-powered" nodes (e.g., node 204-9). Some of the smart device(s) 204 in the smart home environment 100 are battery powered, while others have a regular and reliable power source, such as by connecting to wiring (e.g., to 120V line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the smart home environment 100, as well as with the central server or cloud-computing system 164. In some implementations, one or more "spokesman" nodes operate as a smart home controller. On the other hand, the devices that are battery powered are referred to as "low-power" nodes. These nodes tend to be smaller than spokesman nodes and typically only communicate using wireless protocols that require very little power, such as Zigbee, 6LoWPAN, etc.

In some implementations, some low-power nodes are incapable of bidirectional communication. These low-power nodes send messages, but they are unable to "listen". Thus, other devices in the smart home environment 100, such as the spokesman nodes, cannot send information to these low-power nodes.

As described, the spokesman nodes and some of the low-powered nodes are capable of "listening." Accordingly, users, other devices, and/or the central server or cloud-computing system 164 may communicate control commands to the low-powered nodes. For example, a user may use the portable electronic device 166 (e.g., a smartphone) to send commands over the Internet to the central server or cloud-computing system 164, which then relays the commands to one or more spokesman nodes in the smart home network 202. The spokesman nodes drop down to a low-power protocol to communicate the commands to the low-power nodes throughout the smart home network 202, as well as to other spokesman nodes that did not receive the commands directly from the central server or cloud-computing system 164.

In some implementations, a smart nightlight 170 is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some implementations, the smart nightlight 170 is configured to activate the light source when its ambient light sensor detects that the room is dark and when its occupancy sensor detects that someone is in the room. In other implementations, the smart nightlight 170 is simply configured to activate the light source when its ambient light sensor detects that the room is dark. Further, in some implementations, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart home network 202 as well as over the one or more networks 162 to the central server or cloud-computing system 164.

Other examples of low-power nodes include battery-operated versions of the smart hazard detectors 104. These smart hazard detectors 104 are often located in an area without access to constant and reliable power and may include any number and type of sensors, such as smoke/fire/heat sensors, carbon monoxide/dioxide sensors, occupancy/motion sensors, ambient light sensors, temperature sensors, humidity sensors, and the like. Furthermore, the smart hazard detectors 104 may send messages that correspond to each of the respective sensors to the other devices and/or the central server or cloud-computing system 164, such as by using the mesh network as described above.

Examples of spokesman nodes include smart doorbells 106, smart thermostats 102, smart wall switches 108, and smart wall plugs 110. These devices 102, 106, 108, and 110 are often located near and connected to a reliable power source, and therefore may include more power-consuming components, such as one or more communication chips capable of bidirectional communication in a variety of protocols.

In some implementations, the smart home environment 100 includes service robots 168 that are configured to carry out, in an autonomous manner, any of a variety of household tasks.

Figure 3:
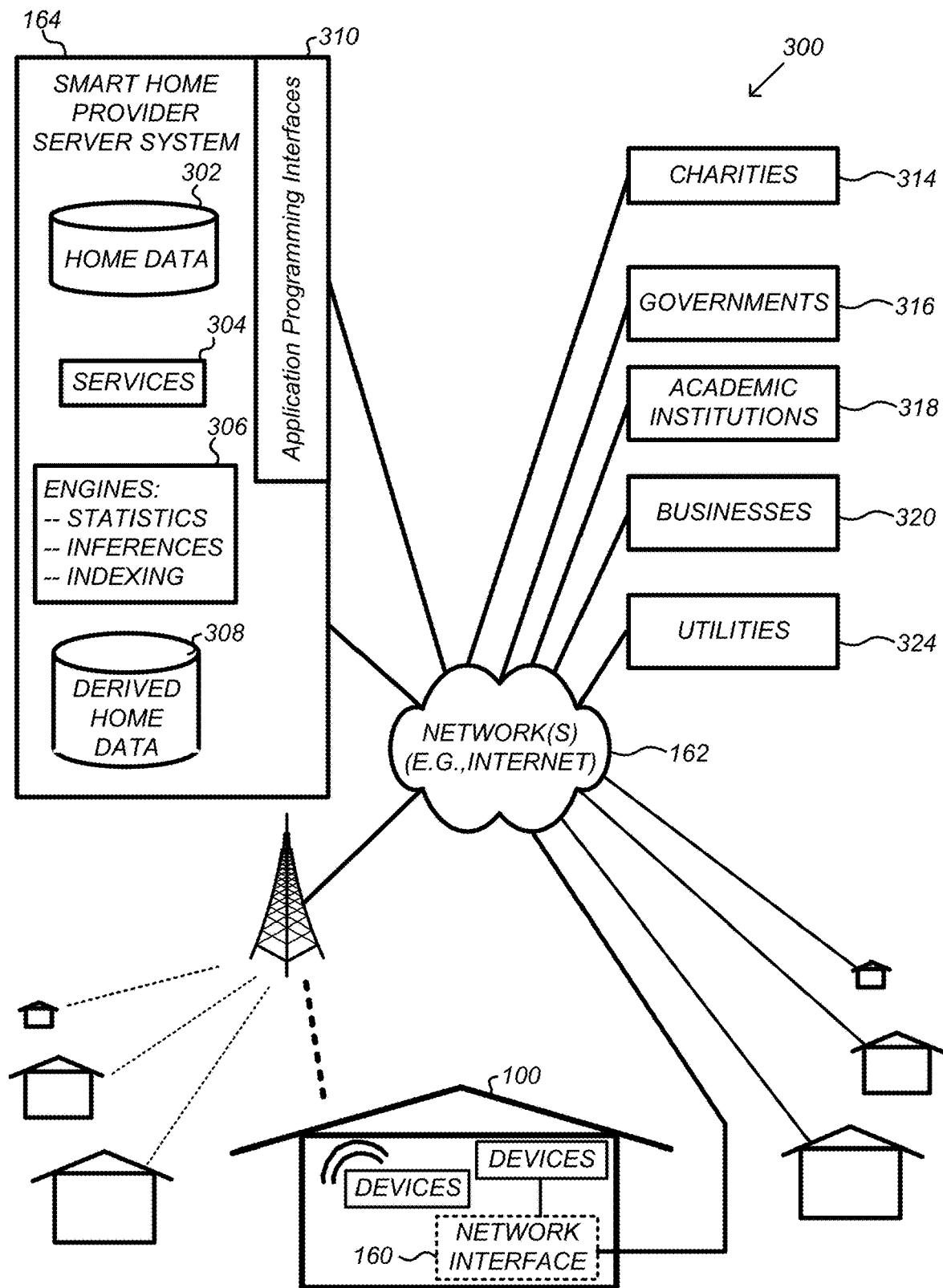
FIG. 3 illustrates a network-level view of an extensible platform for devices and services, which may be integrated with the smart home environment of FIG. 1 in accordance with some implementations.

FIG. 3 illustrates a network-level view of an extensible devices and services platform 300 with which the smart home environment 100 of FIG. 1 is integrated, in accordance with some implementations. The extensible devices and services platform 300 includes remote servers or cloud computing system 164. Each of the intelligent, network-connected devices (e.g., 102, 104, 106, 108, 110, 112, 114, 116, 118, etc.) from FIG. 1 (identified simply as "devices" in FIGS. 2-4) may communicate with the remote servers or cloud computing system 164. For example, a connection to the one or more networks 162 may be established either directly (e.g., using 3G/4G connectivity to a wireless carrier), or through a network interface 160 (e.g., a router, switch, gateway, hub, or an intelligent, dedicated whole-home control node), or through any combination thereof.

In some implementations, the devices and services platform 300 communicates with and collects data from the smart devices of the smart home environment 100. In addition, in some implementations, the devices and services platform 300 communicates with and collects data from a plurality of smart home environments across the world. For example, the smart home provider server system 164 collects home data 302 from the devices of one or more smart home environments, where the devices may routinely transmit home data or may transmit home data in specific instances (e.g., when a device queries the home data 302). Example collected home data 302 includes, without limitation, power consumption data, occupancy data, HVAC settings and usage data, carbon monoxide levels data, carbon dioxide levels data, volatile organic compounds levels data, sleeping schedule data, cooking schedule data, inside and outside temperature and humidity data, television viewership data, inside and outside noise level data, pressure data, video data, etc.

In some implementations, the smart home provider server system 164 provides one or more services 304 to smart homes. Example services 304 include, without limitation, software updates, customer support, sensor data collection/logging, remote access, remote or distributed control, and/or use suggestions (e.g., based on the collected home data 302) to improve performance, reduce utility cost, increase safety, etc. In some implementations, data associated with the services 304 is stored at the smart home provider server system 164, and the smart home provider server system 164 retrieves and transmits the data at appropriate times (e.g., at regular intervals, upon receiving a request from a user, etc.).

In some implementations, the extensible devices and the services platform 300 includes a processing engine 306, which may be concentrated at a single server or distributed among several different computing entities. In some implementations, the processing engine 306 includes engines configured to receive data from the devices of smart home environments (e.g., via the Internet and/or a network interface), to index the data, to analyze the data and/or to generate statistics based on the analysis or as part of the analysis. In some implementations, the analyzed data is stored as derived home data 308.

Results of the analysis or statistics may thereafter be transmitted back to the device that provided home data used to derive the results, to other devices, to a server providing a webpage to a user of the device, or to other non-smart device entities. In some implementations, use statistics, use statistics relative to use of other devices, use patterns, and/or statistics summarizing sensor readings are generated by the processing engine 306 and transmitted. The results or statistics may be provided via the one or more networks 162. In this manner, the processing engine 306 may be configured and programmed to derive a variety of useful information from the home data 302. A single server may include one or more processing engines.

The derived home data 308 may be used at different granularities for a variety of useful purposes, ranging from explicit programmed control of the devices on a per-home, per-neighborhood, or per-region basis (for example, demand-response programs for electrical utilities), to the generation of inferential abstractions that may assist on a per-home basis (for example, an inference may be drawn that the homeowner has left for vacation and so security detection equipment may be put on heightened sensitivity), to the generation of statistics and associated inferential abstractions that may be used for government or charitable purposes. For example, processing engine 306 may generate statistics about device usage across a population of devices and send the statistics to device users, service providers or other entities (e.g., entities that have requested the statistics and/or entities that have provided monetary compensation for the statistics).

In some implementations, to encourage innovation and research and to increase products and services available to users, the devices and services platform 300 exposes a range of application programming interfaces (APIs) 310 to third parties, such as charities 314, governmental entities 316 (e.g., the Food and Drug Administration or the Environmental Protection Agency), academic institutions 318 (e.g., university researchers), businesses 320 (e.g., providing device warranties or service to related equipment, targeting advertisements based on home data), utility companies 324, and other third parties. The APIs 310 are coupled to and permit third-party systems to communicate with the smart home provider server system 164, including the services 304, the processing engine 306, the home data 302, and the derived home data 308. In some implementations, the APIs 310 allow applications executed by the third parties to initiate specific data processing tasks that are executed by the smart home provider server system 164, as well as to receive dynamic updates to the home data 302 and the derived home data 308.

For example, third parties may develop programs and/or applications, such as web applications or mobile applications, that integrate with the smart home provider server system 164 to provide services and information to users. Such programs and applications may be, for example, designed to help users reduce energy consumption, to pre-emptively service faulty equipment, to prepare for high service demands, to track past service performance, etc., and/or to perform other beneficial functions or tasks.

Figure 4:
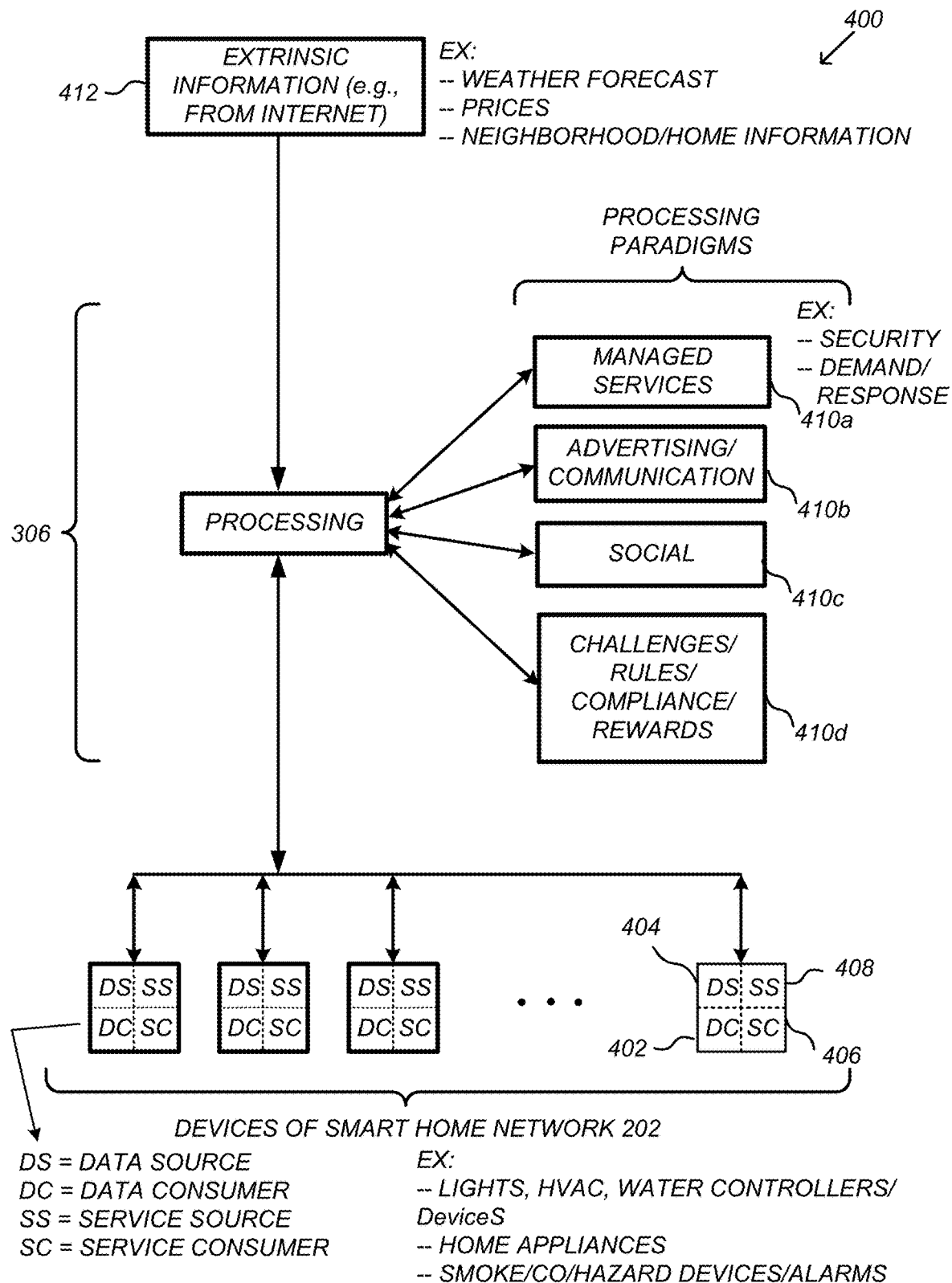
FIG. 4 illustrates an abstracted functional view of the extensible platform of FIG. 3, with reference to a processing engine as well as devices of the smart home environment, in accordance with some implementations.

FIG. 4 illustrates an abstracted functional view 400 of the extensible devices and services platform 300 of FIG. 3, with reference to a processing engine 306 as well as devices of the smart home environment, in accordance with some implementations. Even though devices situated in smart home environments will have a wide variety of different individual capabilities and limitations, the devices may be thought of as sharing common characteristics in that each device is a data consumer 402 (DC), a data source 404 (DS), a services consumer 406 (SC), and a services source 408 (SS). Advantageously, in addition to providing control information used by the devices to achieve their local and immediate objectives, the extensible devices and services platform 300 may also be configured to use the large amount of data that is generated by these devices. In addition to enhancing or optimizing the actual operation of the devices themselves with respect to their immediate functions, the extensible devices and services platform 300 may be directed to "repurpose" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

FIG. 4 shows the processing engine 306 as including a number of processing paradigms 410. In some implementations, the processing engine 306 includes a managed services paradigm 410a that monitors and manages primary or secondary device functions. The device functions may include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, and/or alerting a user of a current or predicted future event or characteristic. In some implementations, the processing engine 306 includes an advertising/communication paradigm 410b that estimates characteristics (e.g., demographic information), desires and/or products of interest of a user based on device usage. Services, promotions, products or upgrades may then be offered or automatically provided to the user. In some implementations, the processing engine 306 includes a social paradigm 410c that uses information from a social network, provides information to a social network (for example, based on device usage), and/or processes data associated with user and/or device interactions with the social network platform. For example, a user's status as reported to trusted contacts on the social network may be updated to indicate when the user is home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

In some implementations, the processing engine 306 includes a challenges/rules/compliance/rewards paradigm 410d that informs a user of challenges, competitions, rules, compliance regulations and/or rewards and/or that uses operation data to determine whether a challenge has been met, a rule or regulation has been complied with and/or a reward has been earned. The challenges, rules, and/or regulations may relate to efforts to conserve energy, to live safely (e.g., reducing exposure to toxins or carcinogens), to conserve money and/or equipment life, to improve health, etc. For example, one challenge may involve participants turning down their thermostat by one degree for one week. Those participants that successfully complete the challenge are rewarded, such as with coupons, virtual currency, status, etc. Regarding compliance, an example involves a rental-property owner making a rule that no renters are permitted to access certain owner's rooms. The devices in the room having occupancy sensors may send updates to the owner when the room is accessed.

In some implementations, the processing engine 306 integrates or otherwise uses extrinsic information 412 from extrinsic sources to improve the functioning of one or more processing paradigms. The extrinsic information 412 may be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, to identify statistical or environmental conditions, trends or other information associated with a home or neighborhood, and so forth.

Figure 5:
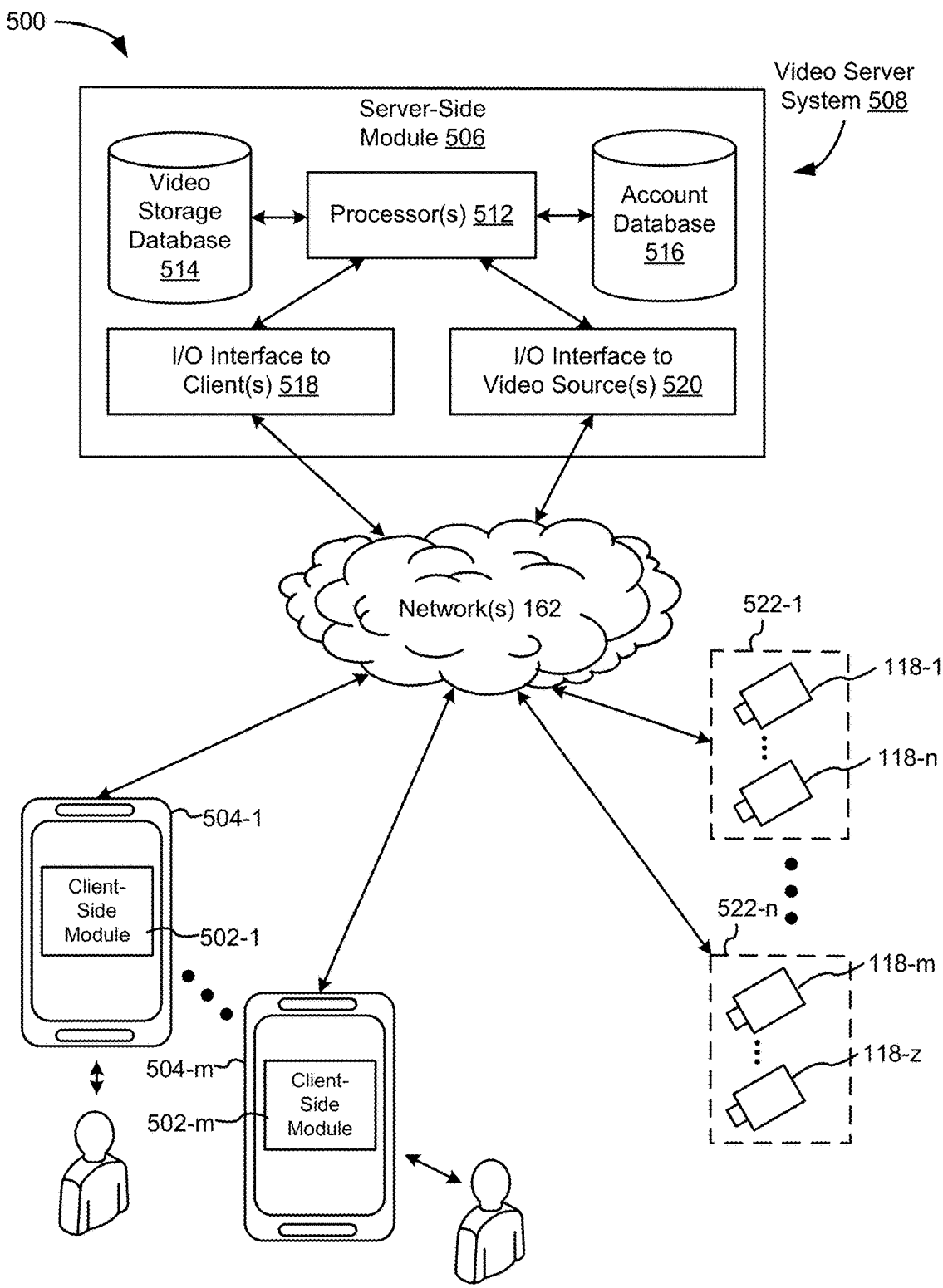
FIG. 5 is a representative operating environment in which a video server system interacts with client devices and video sources in accordance with some implementations.

FIG. 5 illustrates a representative operating environment 500 in which a video server system 508 provides data processing for monitoring and facilitating review of motion events in video streams captured by video cameras 118. As shown in FIG. 5, the video server system 508 receives video data from video sources 522 (including cameras 118) located at various physical locations (e.g., inside homes, restaurants, stores, streets, parking lots, and/or the smart home environments 100 of FIG. 1). Each video source 522 may be bound to one or more reviewer accounts, and the video server system 508 provides video monitoring data for the video source 522 to client devices 504 associated with the reviewer accounts. For example, the portable electronic device 166 is an example of the client device 504.

In some implementations, the smart home provider server system 164 or a component thereof serves as the video server system 508. In some implementations, the video server system 508 is a dedicated video processing server that provides video processing services to video sources and client devices 504 independent of other services provided by the video server system 508.

In some implementations, each of the video sources 522 includes one or more video cameras 118 that capture video and send the captured video to the video server system 508 substantially in real-time. In some implementations, each of the video sources 522 includes a controller device (not shown) that serves as an intermediary between the one or more cameras 118 and the video server system 508. The controller device receives the video data from the one or more cameras 118, optionally performs some preliminary processing on the video data, and sends the video data to the video server system 508 on behalf of the one or more cameras 118 substantially in real-time. In some implementations, each camera has its own on-board processing capabilities to perform some preliminary processing on the captured video data before sending the processed video data (along with metadata obtained through the preliminary processing) to the controller device and/or the video server system 508.

As shown in FIG. 5, in accordance with some implementations, each of the client devices 504 includes a client-side module 502. The client-side module 502 communicates with a server-side module 506 executed on the video server system 508 through the one or more networks 162. The client-side module 502 provides client-side functionality for the event monitoring and review processing and communications with the server-side module 506. The server-side module 506 provides server-side functionality for event monitoring and review processing for any number of client-side modules 502 each residing on a respective client device 504. The server-side module 506 also provides server-side functionality for video processing and camera control for any number of the video sources 522, including any number of control devices and the cameras 118.

In some implementations, the server-side module 506 includes one or more processors 512, a video storage database 514, an account database 516, an I/O interface to one or more client devices 518, and an I/O interface to one or more video sources 520. The I/O interface to one or more clients 518 facilitates the client-facing input and output processing for the server-side module 506. The account database 516 stores a plurality of profiles for reviewer accounts registered with the video processing server, where a respective user profile includes account credentials for a respective reviewer account, and one or more video sources linked to the respective reviewer account. The I/O interface to one or more video sources 520 facilitates communications with one or more video sources 522 (e.g., groups of one or more cameras 118 and associated controller devices). The video storage database 514 stores raw video data received from the video sources 522, as well as various types of metadata, such as motion events, event categories, event category models, event filters, and event masks, for use in data processing for event monitoring and review for each reviewer account.

Examples of a representative client device 504 include a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, a vehicle-mounted computer, an ebook reader, or a combination of any two or more of these data processing devices or other data processing devices.

Examples of the one or more networks 162 include local area networks (LAN) and wide area networks (WAN) such as the Internet. The one or more networks 162 are implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the video server system 508 is implemented on one or more standalone data processing apparatuses or a distributed network of computers. In some implementations, the video server system 508 also employs various virtual devices and/or services of third party service providers (e.g., third-party cloud service providers) to provide the underlying computing resources and/or infrastructure resources of the video server system 508. In some implementations, the video server system 508 includes, but is not limited to, a handheld computer, a tablet computer, a laptop computer, a desktop computer, or a combination of any two or more of these data processing devices or other data processing devices.

The server-client environment 500 shown in FIG. 5 includes both a client-side portion (e.g., the client-side module 502) and a server-side portion (e.g., the server-side module 506). The division of functionality between the client and server portions of operating environment 500 can vary in different implementations. Similarly, the division of functionality between a video source 522 and the video server system 508 can vary in different implementations. For example, in some implementations, the client-side module 502 is a thin-client that provides only user-facing input and output processing functions, and delegates all other data processing functionality to a backend server (e.g., the video server system 508). Similarly, in some implementations, a respective one of the video sources 522 is a simple video capturing device that continuously captures and streams video data to the video server system 508 with limited or no local preliminary processing on the video data. Although many aspects of the present technology are described from the perspective of the video server system 508, the corresponding actions performed by a client device 504 and/or the video sources 522 would be apparent to one of skill in the art. Similarly, some aspects of the present technology may be described from the perspective of a client device or a video source, and the corresponding actions performed by the video server would be apparent to one of skill in the art. Furthermore, some aspects of the present technology may be performed by the video server system 508, a client device 504, and a video source 522 cooperatively.

Figure 6:
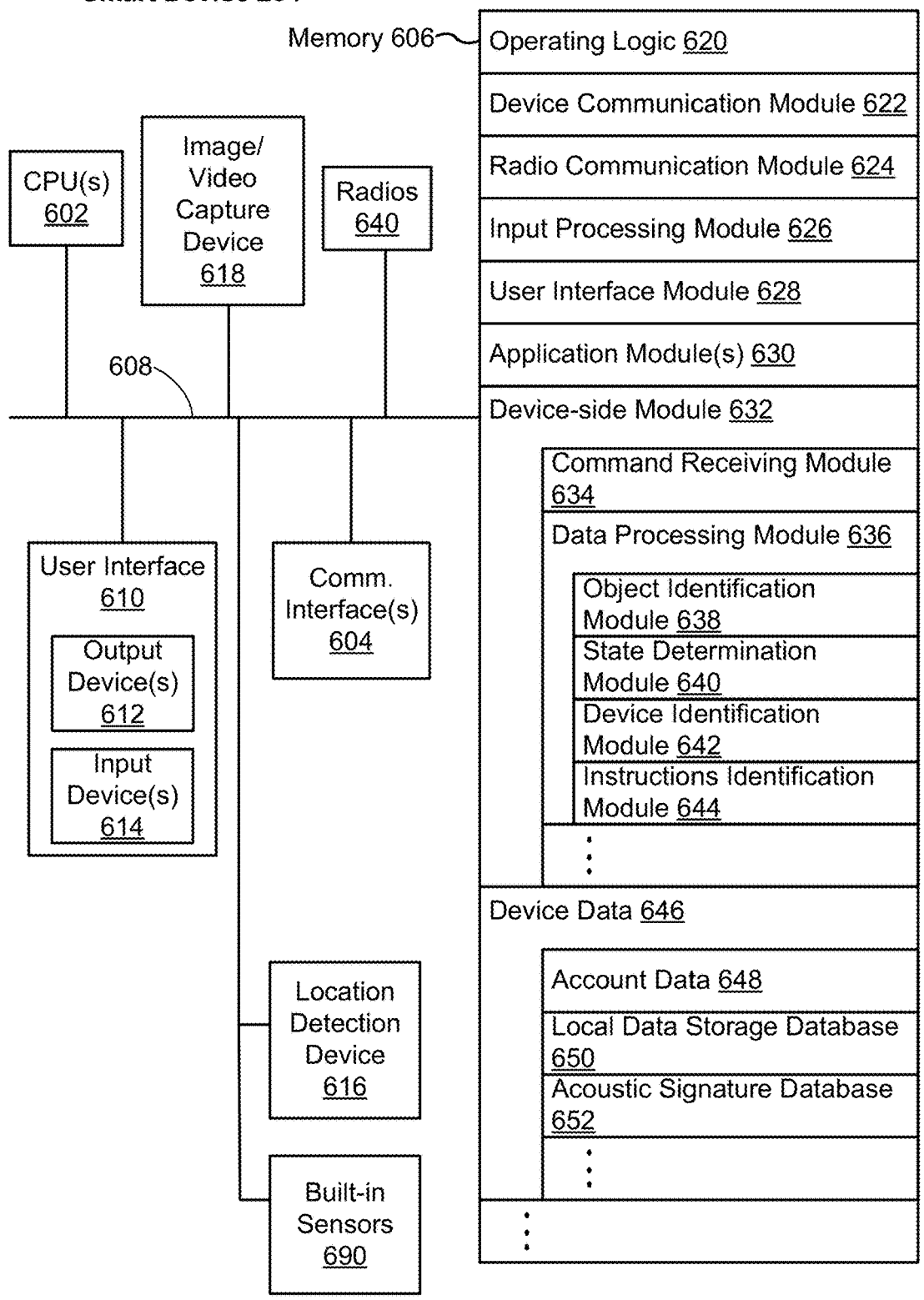
FIG. 6 is a block diagram illustrating a representative smart device, in accordance with some implementations.

FIG. 6 is a block diagram illustrating a representative smart device 204 in accordance with some implementations. In some implementations, the smart device 204 (e.g., any devices of a smart home environment 100 as described in FIGS. 1 and 2, such as a thermostat 102, camera device 118, hazard detector 104, etc.) includes one or more processing units (e.g., CPUs, ASICs, FPGAs, microprocessors, and the like) 602, one or more communication interfaces 604, memory 606, radios 640, and one or more communication buses 608 for interconnecting these components (sometimes called a chipset). In some implementations, user interface 610 includes one or more output devices 612 that enable presentation of media content, including one or more speakers and/or one or more visual displays. In some implementations, user interface 610 also includes one or more input devices 614, including user interface components that facilitate user input such as a keyboard, a mouse, a voice-command input unit or microphone, a touch screen display, a touch-sensitive input pad, a gesture capturing camera, or other input buttons or controls. Furthermore, some smart devices 204 use a microphone and voice recognition or a camera and gesture recognition to supplement or replace the keyboard. In some implementations, the smart device 204 includes one or more image/video capture devices 618 (e.g., cameras, video cameras, scanners, photo sensor units). Optionally, the client device includes a location detection device 616, such as a GPS (global positioning satellite) or other geo-location receiver, for determining the location of the smart device 204.

The built-in sensors 690 include, for example, one or more thermal radiation sensors, acoustic sensors (e.g., microphones), ambient temperature sensors, humidity sensors, IR sensors, occupancy sensors (e.g., using RFID sensors), ambient light sensors, motion detectors, accelerometers, and/or gyroscopes.

The radios 640 enable one or more radio communication networks in the smart home environments, and allow a smart device 204 to communicate directly with other devices. In some implementations, the radios 640 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document.

Communication interfaces 604 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Figure 10:
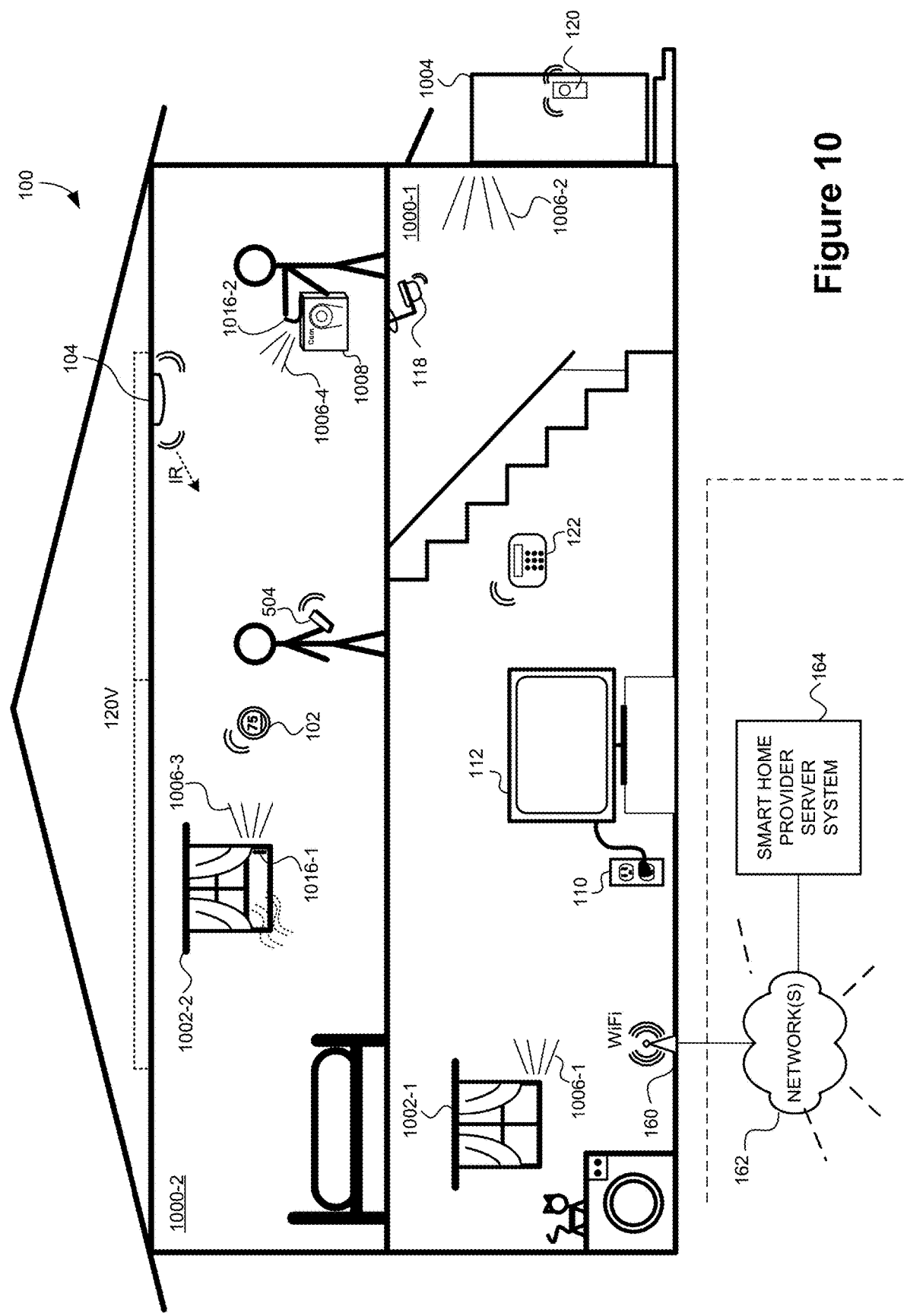
FIG. 10 is a representative smart home environment, in accordance with some implementations.

Memory 606 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 606, or alternatively the non-volatile memory within memory 606, includes a non-transitory computer readable storage medium. In some implementations, memory 606, or the non-transitory computer readable storage medium of memory 606, stores the following programs, modules, and data structures, or a subset or superset thereof:

Operating logic 620 including procedures for handling various basic system services and for performing hardware dependent tasks;
Device communication module 622 for connecting to and communicating with other network devices (e.g., network interface 160, such as a router that provides Internet connectivity, networked storage devices, network routing devices, server system 508, etc.) connected to one or more networks 162 via one or more communication interfaces 604 (wired or wireless);

Radio Communication Module 624 for connecting the smart device 204 to and communicating with other devices (e.g., controller devices, smart devices 204 in smart home environment 100, client devices 504) via one or more radio communication devices (e.g., radios 640);

Input processing module 626 for detecting one or more user inputs or interactions from the one or more input devices 614 and interpreting the detected inputs or interactions;

User interface module 628 for providing and displaying a user interface in which settings, captured data, and/or other data for one or more devices (e.g., the smart device 204, and/or other devices in smart home environment 100) can be configured and/or viewed;

One or more applications 630 for execution by the smart device 630 (e.g., games, social network applications, smart home applications, and/or other web or non-web based applications) for controlling devices (e.g., executing commands, sending commands, and/or configuring settings of the smart device 204 and/or other client/electronic devices), and for reviewing data captured by devices (e.g., device status and settings, captured data, or other information regarding the smart device 204 and/or other client/electronic devices);

Device-side module 632, which provides device-side functionalities for device control, data processing, data review, and performing one or more device-specific functionalities (examples of which are described above with respect to FIG. 1), including but not limited to:

Command receiving module 634 for receiving, forwarding, and/or executing instructions and control commands (e.g., from a client device 504, from a smart home provider server system 164, from user inputs detected on the user interface 610, etc.) for operating the smart device 204; and Data processing module 636 for processing data (e.g., acoustic signals) captured or received by one or more inputs (e.g., input devices 614, image/video capture devices 618, location detection device 616), sensors (e.g., built-in sensors 690), interfaces (e.g., communication interfaces 604, radios 640), other devices (e.g., other devices to which the smart device 204 is communicably coupled), and/or other components of the smart device 204, and for preparing and sending processed data to a device for review (e.g., client devices 504 for review by a user), including:

Object identification module 638 for identifying monitored objects that correspond to detected acoustic signals (e.g., window 1002-1 corresponding to acoustic signal 1006-1, FIG. 10);

State determination module 640 for determining a state (of an identified monitored object) that corresponds to a detected acoustic signal (e.g., open state of window 1002-1 corresponding to acoustic signal 1006-1, FIG. 10);

Device identification module 642 for identifying devices to be provisioned that correspond to detected acoustic signals (e.g., a camera device contained within product packaging 1008, corresponding to acoustic signal 1006-4, FIG. 10); and Instructions identification module 644 for identifying sets of executable instructions that correspond to detected acoustic signals (e.g., instructions to register device with home system, table 1200, FIG. 12B); and Device data 646 storing data associated with devices (e.g., the smart device 204), including, but is not limited to:

Account data 648 storing information related to user accounts loaded on the smart device 204, wherein such information includes cached login credentials, smart device identifiers (e.g., MAC addresses and UUIDs), user interface settings, display preferences, authentication tokens and tags, password keys, etc.;

Local data storage database 650 for selectively storing raw or processed data associated with the smart device 204 (e.g., video surveillance footage captured by a camera 118); and Acoustic signature database 652 for storing acoustic signatures and associated data (e.g., monitored objects and states, table 1100; non-provisioned devices and sets of executable instructions, table 1200; etc.).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 606, optionally, stores a subset of the modules and data structures identified above. Furthermore, memory 606, optionally, stores additional modules and data structures not described above.

Figure 7:
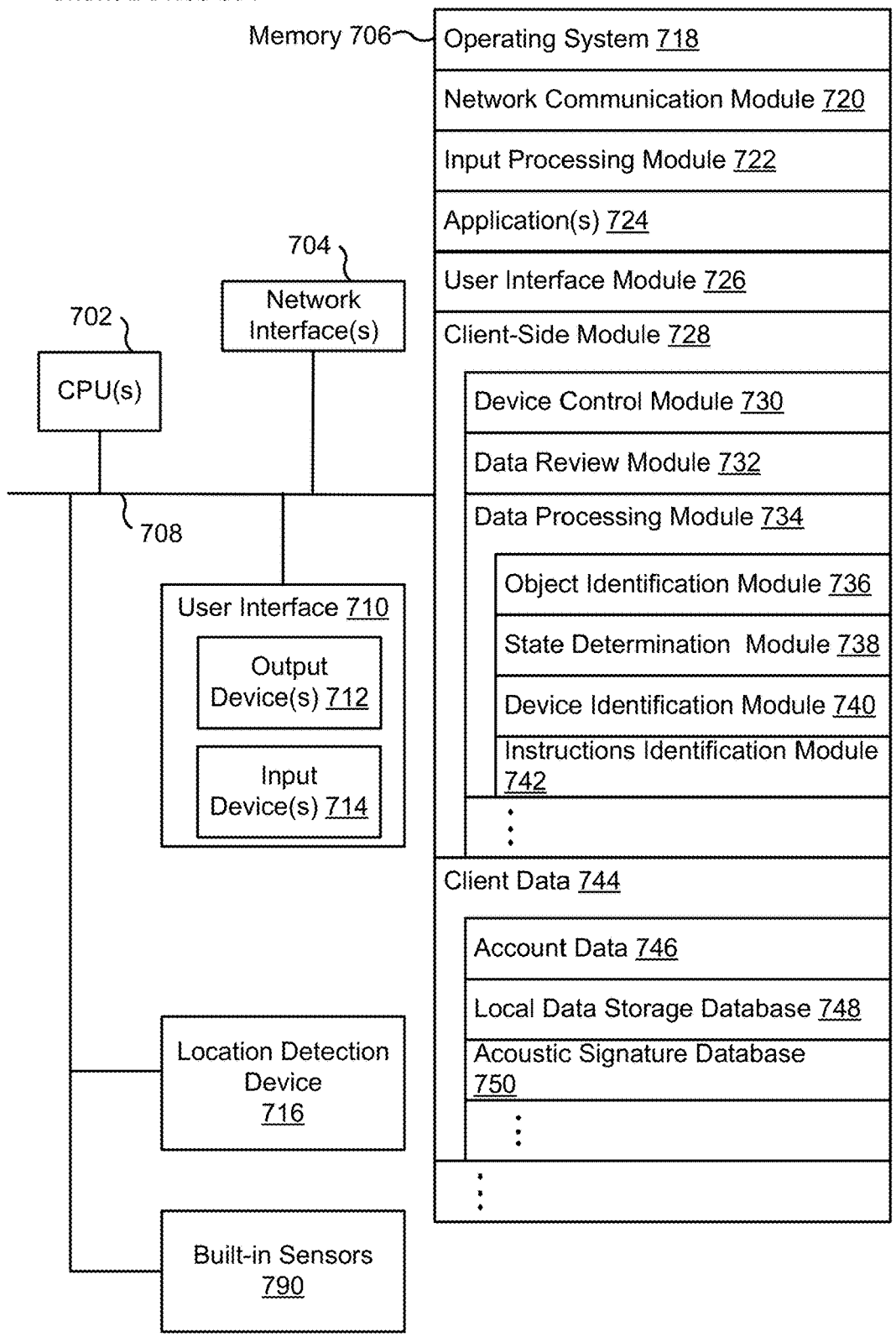
FIG. 7 is a block diagram illustrating a representative client device, in accordance with some implementations.

FIG. 7 is a block diagram illustrating a representative client device 504 associated with a user account in accordance with some implementations. The client device 504, typically, includes one or more processing units (CPUs) 702, one or more network interfaces 704, memory 706, and one or more communication buses 708 for interconnecting these components (sometimes called a chipset). Optionally, the client device also includes a user interface 710 and one or more built-in sensors 790 (e.g., accelerometer, gyroscope, microphone, etc.). User interface 710 includes one or more output devices 712 that enable presentation of media content, including one or more speakers and/or one or more visual displays. User interface 710 also includes one or more input devices 714, including user interface components that facilitate user input such as a keyboard, a mouse, a voice-command input unit or microphone, a touch screen display, a touch-sensitive input pad, a gesture capturing camera, or other input buttons or controls. Furthermore, some the client devices use a microphone and voice recognition or a camera and gesture recognition to supplement or replace the keyboard. In some implementations, the client device includes one or more cameras, scanners, or photo sensor units for capturing images (not shown). Optionally, the client device includes a location detection device 716, such as a GPS (global positioning satellite) or other geo-location receiver, for determining the location of the client device.

Memory 706 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 706, optionally, includes one or more storage devices remotely located from one or more processing units 702. Memory 706, or alternatively the non-volatile memory within memory 706, includes a non-transitory computer readable storage medium. In some implementations, memory 706, or the non-transitory computer readable storage medium of memory 706, stores the following programs, modules, and data structures, or a subset or superset thereof:

Operating system 718 including procedures for handling various basic system services and for performing hardware dependent tasks;

Network communication module 720 for connecting the client device 504 to and communicating with other systems and devices (e.g., client devices, electronic devices, smart devices 204, and systems connected to one or more networks 162, FIGS. 1-5) via one or more network interfaces 704 (wired or wireless);

Input processing module 722 for detecting one or more user inputs or interactions from one of the one or more input devices 714 and interpreting the detected input or interaction;

One or more applications 724 for execution by the client device (e.g., games, social network applications, smart home applications, and/or other web or non-web based applications) for controlling devices (e.g., sending commands, configuring settings, etc. to hub devices and/or other client or electronic devices) and for reviewing data captured by the devices (e.g., device status and settings, captured data, or other information regarding the hub device or other connected devices);

User interface module 726 for providing and displaying a user interface in which settings, captured data, and/or other data for one or more devices (e.g., smart devices 204 in smart home environment 100) can be configured and/or viewed;

Client-side module 728, which provides client-side functionalities for device control, data processing and data review, including but not limited to:

Device control module 730 for generating control commands for controlling or modifying operating modes of electronic devices (e.g., smart devices 204) in accordance with user inputs;

Data review module 732 for providing user interfaces for reviewing data processed by the hub server system 508; and Data processing module 734 for processing data (e.g., acoustic signals) captured or received by one or more inputs (e.g., input devices 714, image/video capture devices, location detection device 716), sensors (e.g., built-in sensors 790), interfaces (e.g., network interfaces 704), other devices (e.g., other smart devices 204 to which the client device 504 is communicably coupled), and/or other components of the client device 504, including:

Object identification module 736 for identifying monitored objects that correspond to detected acoustic signals (e.g., window 1002-1 corresponding to acoustic signal 1006-1, FIG. 10);

State determination module 738 for determining a state (of an identified monitored object) that corresponds to a detected acoustic signal (e.g., open state of window 1002-1 corresponding to acoustic signal 1006-1, FIG. 10);

Device identification module 740 for identifying devices to be provisioned that correspond to detected acoustic signals (e.g., a camera device contained within product packaging 1008, corresponding to acoustic signal 1006-4, FIG. 10); and Instructions identification module 742 for identifying sets of executable instructions that correspond to detected acoustic signals (e.g., instructions to register device with home system, table 1200, FIG. 12B); and Client data 744 storing data associated with the user account and electronic devices, including, but is not limited to:

Account data 746 storing information related to both user accounts loaded on the client device and electronic devices (e.g., of the video sources 522) associated with the user accounts, wherein such information includes cached login credentials, hub device identifiers (e.g., MAC addresses and UUIDs), electronic device identifiers (e.g., MAC addresses and UUIDs), user interface settings, display preferences, authentication tokens and tags, password keys, etc.;

o Local data storage database 748 for selectively storing raw or processed data associated with electronic devices (e.g., of the video sources 522, such as a camera 118); and Acoustic signature database 750 for storing acoustic signatures and associated data (e.g., monitored objects and states, table 1100; non-provisioned devices and sets of executable instructions, table 1200; etc.).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 706, optionally, stores a subset of the modules and data structures identified above. Furthermore, memory 706, optionally, stores additional modules and data structures not described above.

Figure 8:
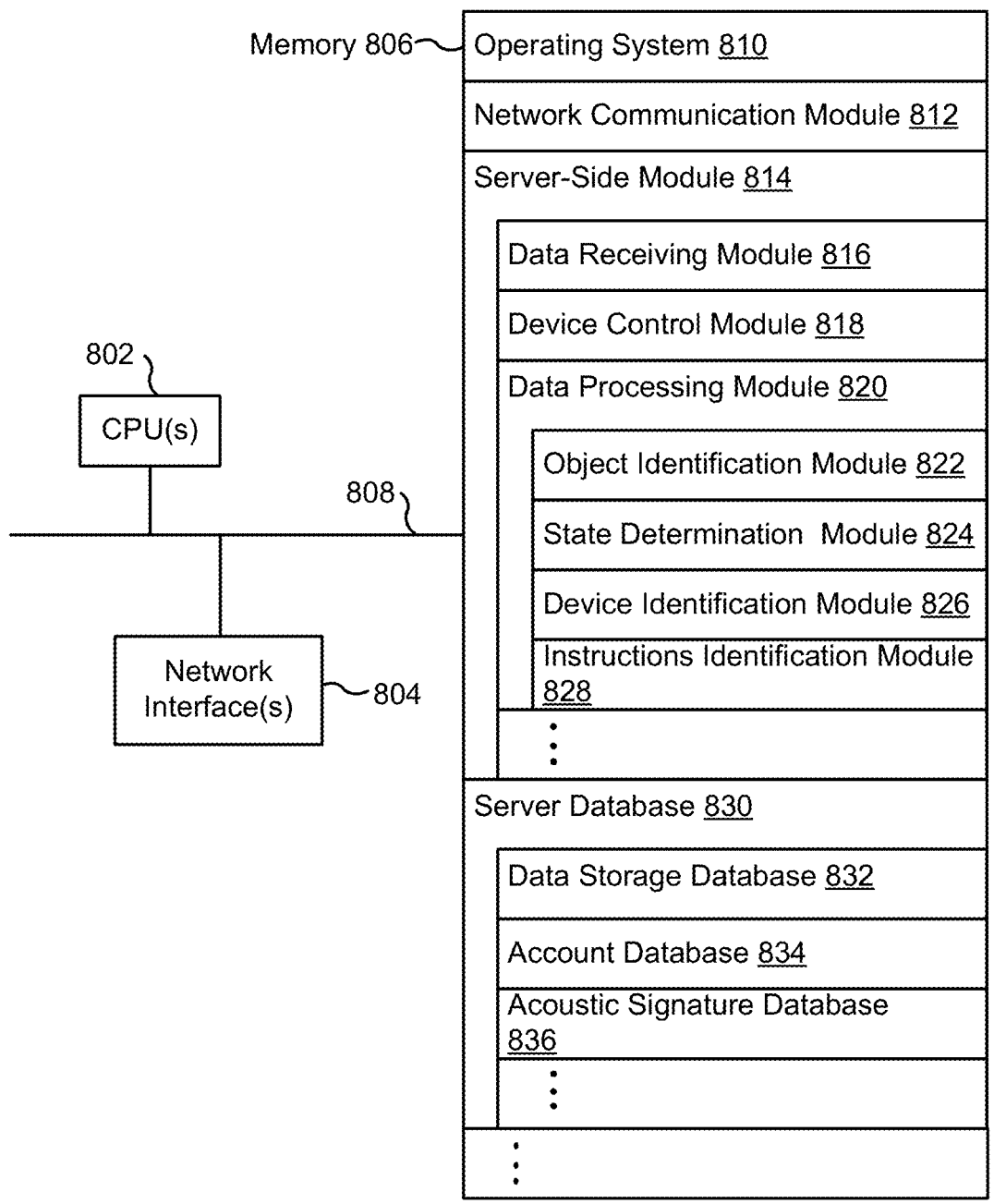
FIG. 8 is a block diagram illustrating a representative smart home provider server system, in accordance with some implementations.

FIG. 8 is a block diagram illustrating the smart home provider server system 164 in accordance with some implementations. The smart home provider server system 164, typically, includes one or more processing units (CPUs) 802, one or more network interfaces 804 (e.g., including an I/O interface to one or more client devices and an I/O interface to one or more electronic devices), memory 806, and one or more communication buses 808 for interconnecting these components (sometimes called a chipset). Memory 806 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 806, optionally, includes one or more storage devices remotely located from one or more processing units 802. Memory 806, or alternatively the non-volatile memory within memory 806, includes a non-transitory computer readable storage medium. In some implementations, memory 806, or the non-transitory computer readable storage medium of memory 806, stores the following programs, modules, and data structures, or a subset or superset thereof:

Operating system 810 including procedures for handling various basic system services and for performing hardware dependent tasks;

Network communication module 812 for connecting the smart home provider server system 164 to and communicating with other systems and devices (e.g., client devices, electronic devices, smart devices 204, and systems connected to one or more networks 162, FIGS. 1-5) via one or more network interfaces 804 (wired or wireless);

Server-side module 814, which provides server-side functionalities for device control, data processing and data review, including but not limited to:

Data receiving module 816 for receiving data from electronic devices (e.g., acoustic signals received from smart devices 204, video data from a camera 118, etc.), and preparing the received data for further processing and storage in the data storage database 8160;

Device control module 818 for generating and sending server-initiated control commands to modify operation modes of electronic devices (e.g., devices of a smart home environment 100), and/or receiving (e.g., from client devices 504) and forwarding user-initiated control commands to modify operation modes of the electronic devices; and Data processing module 820 for processing data (e.g., acoustic signals) captured or received from electronic devices (e.g., acoustic signals detected by smart devices 204 in a smart home environment 100, FIG. 10), and/or preparing and sending processed data to a device for review (e.g., client devices 504 for review by a user), including:

Object identification module 822 for identifying monitored objects that correspond to detected acoustic signals (e.g., window 1002-1 corresponding to acoustic signal 1006-1, FIG. 10);

State determination module 824 for determining a state (of an identified monitored object) that corresponds to a detected acoustic signal (e.g., open state of window 1002-1 corresponding to acoustic signal 1006-1, FIG. 10);

Device identification module 826 for identifying devices to be provisioned that correspond to detected acoustic signals (e.g., a camera device contained within product packaging 1008, corresponding to acoustic signal 1006-4, FIG. 10); and Instructions identification module 828 for identifying sets of executable instructions that correspond to detected acoustic signals (e.g., instructions to register device with home system, table 1200, FIG. 12B); and Server database 830, including but not limited to:

Data storage database 832 for storing data associated with each electronic device (e.g., each camera) of each user account, as well as data processing models, processed data results, and other relevant metadata (e.g., names of data results, location of electronic device, creation time, duration, settings of the electronic device, etc.) associated with the data, wherein (optionally) all or a portion of the data and/or processing associated with the electronic devices are stored securely;

Account database 834 for storing account information for user accounts, including user account information, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles; and Acoustic signature database 836 for storing acoustic signatures and associated data (e.g., monitored objects and states, table 1100; non-provisioned devices and sets of executable instructions, table 1200; etc.).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 806, optionally, stores a subset of the modules and data structures identified above. Furthermore, memory 806, optionally, stores additional modules and data structures not described above.

Figure 9:
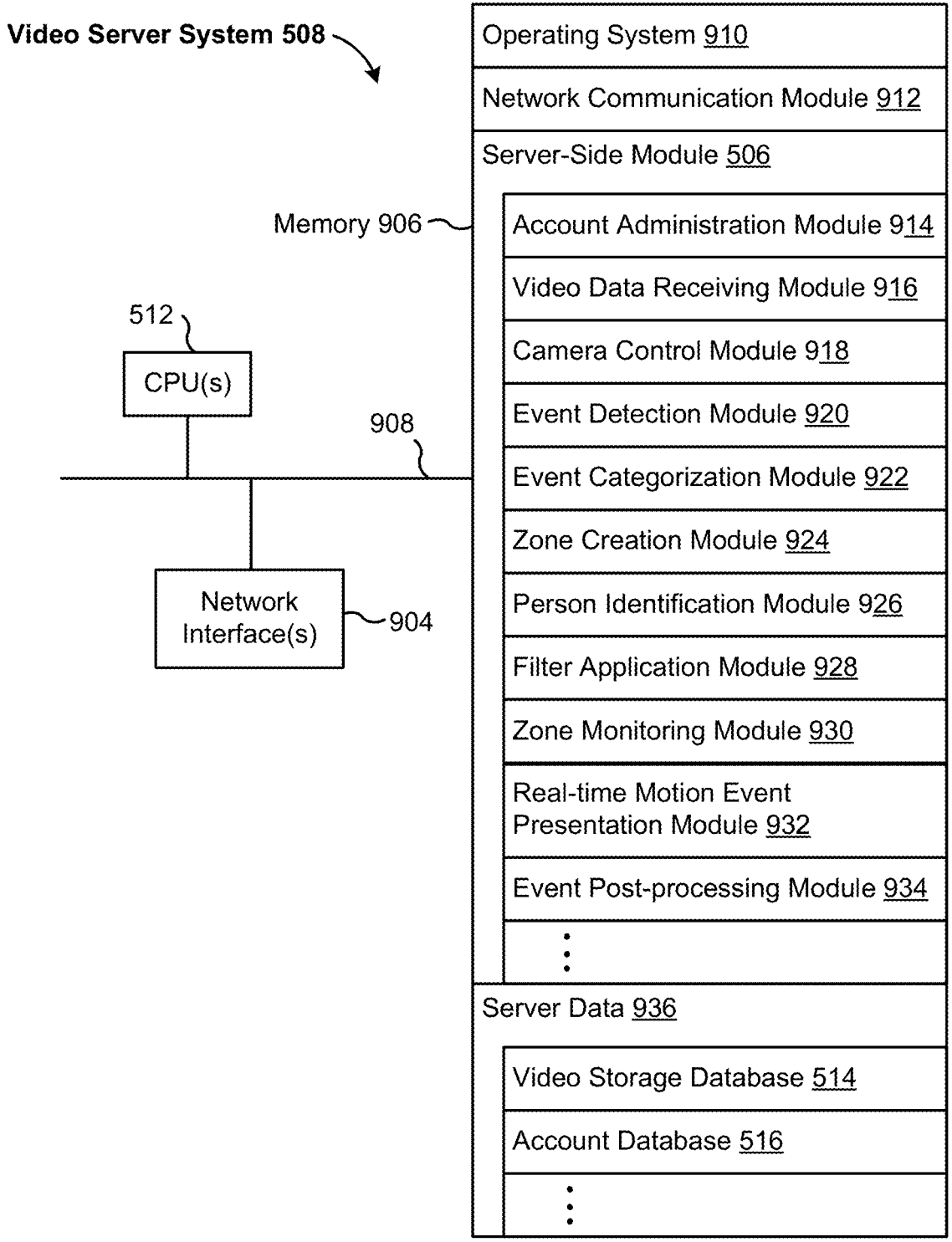
FIG. 9 is a block diagram illustrating a representative video server system, in accordance with some implementations.

FIG. 9 is a block diagram illustrating a video server system 508 in accordance with some implementations. The video server system 508 typically includes one or more processing units (CPUs) 512, one or more network interfaces 904 (e.g., including the I/O interface to one or more clients 504 and the I/O interface to one or more video sources 522), memory 906, and one or more communication buses 908 for interconnecting these components (sometimes called a chipset). The memory 906 includes high-speed random access memory, such as DRAM, SRAM, DDR RAM, or other random access solid state memory devices. In some implementations, the memory 906 includes non-volatile memory, such as one or more magnetic disk storage devices, one or more optical disk storage devices, one or more flash memory devices, or one or more other non-volatile solid state storage devices. In some implementations, the memory 906 includes one or more storage devices remotely located from the one or more processing units 512. The memory 906, or alternatively the non-volatile memory within the memory 906, comprises a non-transitory computer readable storage medium. In some implementations, the memory 906, or the non-transitory computer readable storage medium of the memory 906, stores the following programs, modules, and data structures, or a subset or superset thereof:

an operating system 910, including procedures for handling various basic system services and for performing hardware dependent tasks;

a network communication module 912 for connecting the video server system 508 to other computing devices (e.g., the client devices 504 and the video sources 522 including camera(s) 118) connected to the one or more networks 162 via the one or more network interfaces 904 (wired or wireless);

a server-side module 506, which provides server-side data processing and functionality for the event monitoring and review, including but not limited to:

an account administration module 914 for creating reviewer accounts, performing camera registration processing to establish associations between video sources to their respective reviewer accounts, and providing account login-services to the client devices 504;

a video data receiving module 916 for receiving raw video data from the video sources 522, and preparing the received video data for event processing and long-term storage in the video storage database 514;

a camera control module 918 for generating and sending server-initiated control commands to modify the operation modes of the video sources, and/or receiving and forwarding user-initiated control commands to modify the operation modes of the video sources 522;

an event detection module 920 for detecting motion event candidates in video streams from each of the video sources 522, including motion track identification, false positive suppression, and event mask generation and caching;

an event categorization module 922 for categorizing motion events detected in received video streams;

a zone creation module 924 for generating zones of interest in accordance with user input;

a person identification module 926 for identifying characteristics associated with the presence of humans in the received video streams;

a filter application module 928 for selecting event filters (e.g., event categories, zones of interest, a human filter, etc.) and applying the selected event filters to past and new motion events detected in the video streams;

a zone monitoring module 930 for monitoring motion within selected zones of interest and generating notifications for new motion events detected within the selected zones of interest, where the zone monitoring takes into account changes in the surrounding context of the zones and is not confined within the selected zones of interest;

a real-time motion event presentation module 932 for dynamically changing characteristics of event indicators displayed in user interfaces as new event filters, such as new event categories or new zones of interest, and for providing real-time notifications as new motion events are detected in the video streams; and an event post-processing module 934 for providing summary time-lapse for past motion events detected in video streams, and providing event and category editing functions to users for revising past event categorization results; and server data 936, which includes data for use in data processing of motion event monitoring and review. In some implementations, this includes one or more of:

a video storage database 514 storing raw video data associated with each of the video sources 522 (each including one or more cameras 118) of each reviewer account, as well as event categorization models (e.g., event clusters, categorization criteria, etc.), event categorization results (e.g., recognized event categories, and assignment of past motion events to the recognized event categories, representative events for each recognized event category, etc.), event masks for past motion events, video segments for each past motion event, preview video (e.g., sprites) of past motion events, and other relevant metadata (e.g., names of event categories, locations of the cameras 118, creation time, duration, DTPZ settings of the cameras 118, etc.) associated with the motion events; and an account database 516 for storing account information for reviewer accounts, including login-credentials, associated video sources, relevant user and hardware characteristics (e.g., service tier, camera model, storage capacity, processing capabilities, etc.), user interface settings, monitoring preferences, etc.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 906 stores a subset of the modules and data structures identified above. In some implementations, the memory 906 stores additional modules and data structures not described above.

In some implementations, the functions of any of the devices and systems described herein (e.g., smart device 204, client device 504, smart home provider server system 164, video server system 508, etc.) are interchangeable with one another and may be performed by any other devices or systems, where the corresponding sub-modules of these functions may additionally and/or alternatively be located within and executed by any of the devices and systems. The devices and systems shown in and described with respect to FIGS. 6-9 are merely illustrative, and different configurations of the modules for implementing the functions described herein are possible in various implementations.

FIG. 10 is an example smart home environment 100 in accordance with some implementations. The smart home environment 100 in FIG. 10 includes multiple smart devices (e.g., smart devices 204, FIG. 2) positioned in various locations of the premises, each of the smart devices having various sensor, processing, and functional capabilities. The smart devices include a thermostat 102, a client device 504 (e.g., a smart phone), a network interface 160 (e.g., a router), a wall plug 110, an appliance 112 (e.g., a TV), an alarm system 122, a camera 118, a hazard detector 104, and a door lock 120. As described with respect to FIG. 1, some or all of the smart devices are communicably connected to (or capable of transmitting data between) one another, and through the network 162 (e.g., Internet), may communicate with a smart home provider server system 164 so as to make a variety of services available to users associated with the smart home environment 100.

Figure 11A:
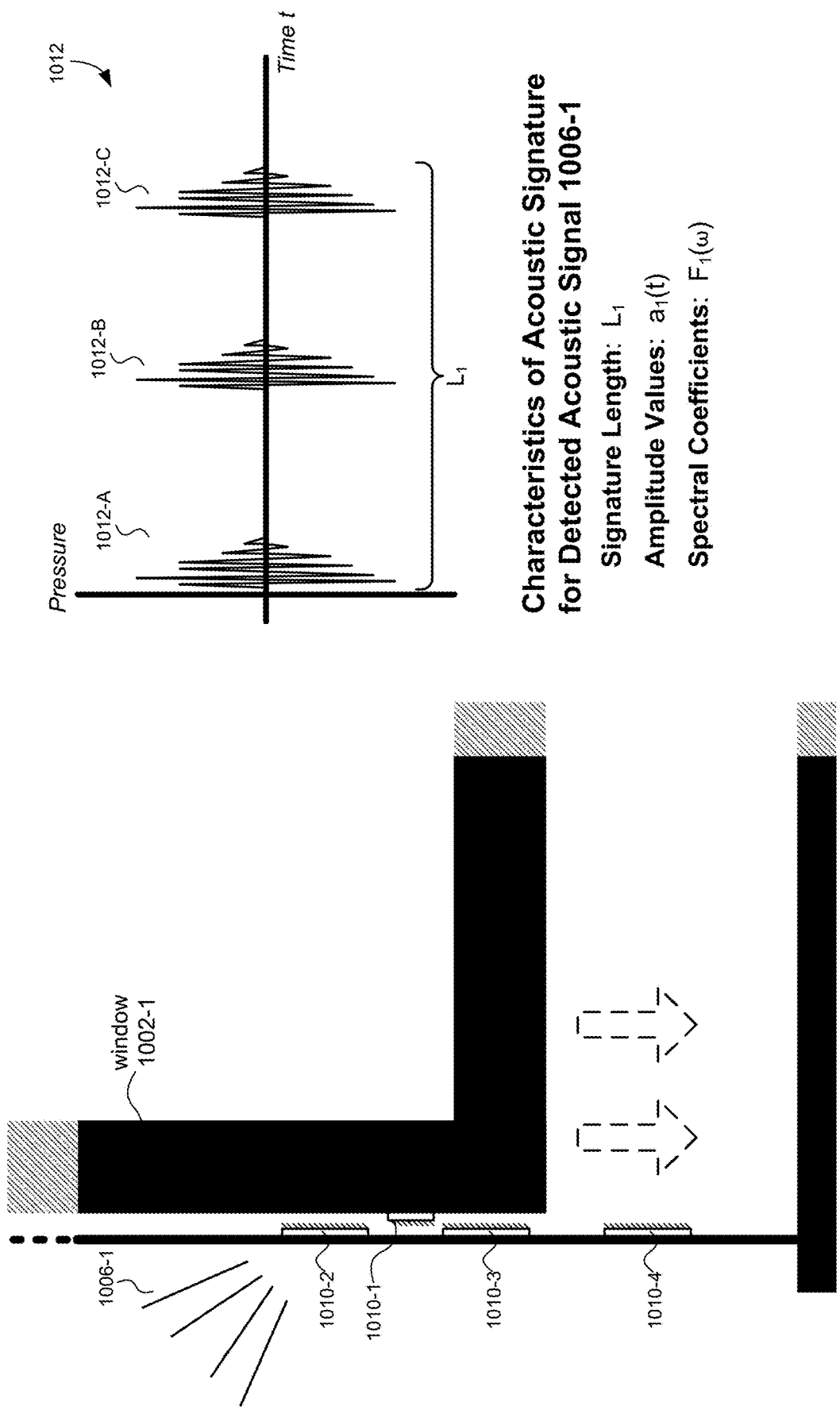
FIG. 11A illustrates a tag, a monitored object, and an acoustic signature of a generated acoustic signal, in accordance with some implementations.

The premises shown in FIG. 10 includes multiple rooms 1000-1 and 1000-2 having a number of entryways, such as windows 1002-1 and 1002-2, and doorway 1004. Attached to (or otherwise integrated with) one or more of these entryways is a passive (i.e., electrically non-powered) tag that generates a predefined acoustic signal (i.e., a sound) in response to physical motion associated with entryways. For example, a tag (e.g., tags 1016-1 and 1016-2, which correspond to and are described in greater detail as tags 1010 in FIGS. 11A and 12A) may be a material affixed to the side of the window 1002-1, positioned such that contact with the tag and a window frame (or a complimentary tag affixed to the window frame) generates a particular acoustic signal 1006-1 as the window is opened or closed. An example of such a tag is shown in FIG. 11A. Similarly, tags affixed to the door 1004 and the window 1002-2 generate respective acoustic signals 1006-2 and 1006-3. Acoustic signals generated in response to physical motion in this manner are characterized by acoustic signatures having measurable properties or characteristics, the signatures corresponding to time or frequency domain representations of the acoustic signals. Characteristics of acoustic signatures may include a length (in time) of an acoustic signature/signal, amplitude values (e.g., measured as sound pressure, sound intensity, sound pressure level, etc.), and spectral coefficients for one or more respective frequencies (e.g., frequency domain representation of the acoustic signal).

By manipulating tags to generate acoustic signals having specified signatures, various objects of a smart home environment 100 (e.g., entryways, appliances, etc.) and their states (e.g., opened, closed, etc.) can be easily monitored and identified. In particular, as described in greater detail below, any one (or a combination) of the smart devices positioned throughout the smart home environment 100 can be used to detect and analyze acoustic signals generated by tags to determine a current state of or other information regarding a monitored object. This may be done by comparing the acoustic signature of the detected acoustic signal against a database of stored acoustic signatures, where the stored acoustic signatures are mapped to respective objects and states of those objects. Examples of further implementations could be tags affixed to mechanical systems in such a way that the tags would "trigger" an acoustic alert (e.g., an acoustic signal with a defined acoustic signature) in the event of a specific failure (e.g., mechanical breakage). Another example of a further implementation would be tags that could be affixed to objects of value in the home such that displacement (e.g., which causes generation of acoustic signal having an acoustic signature) would trigger an alert to the system.

Figure 12A:
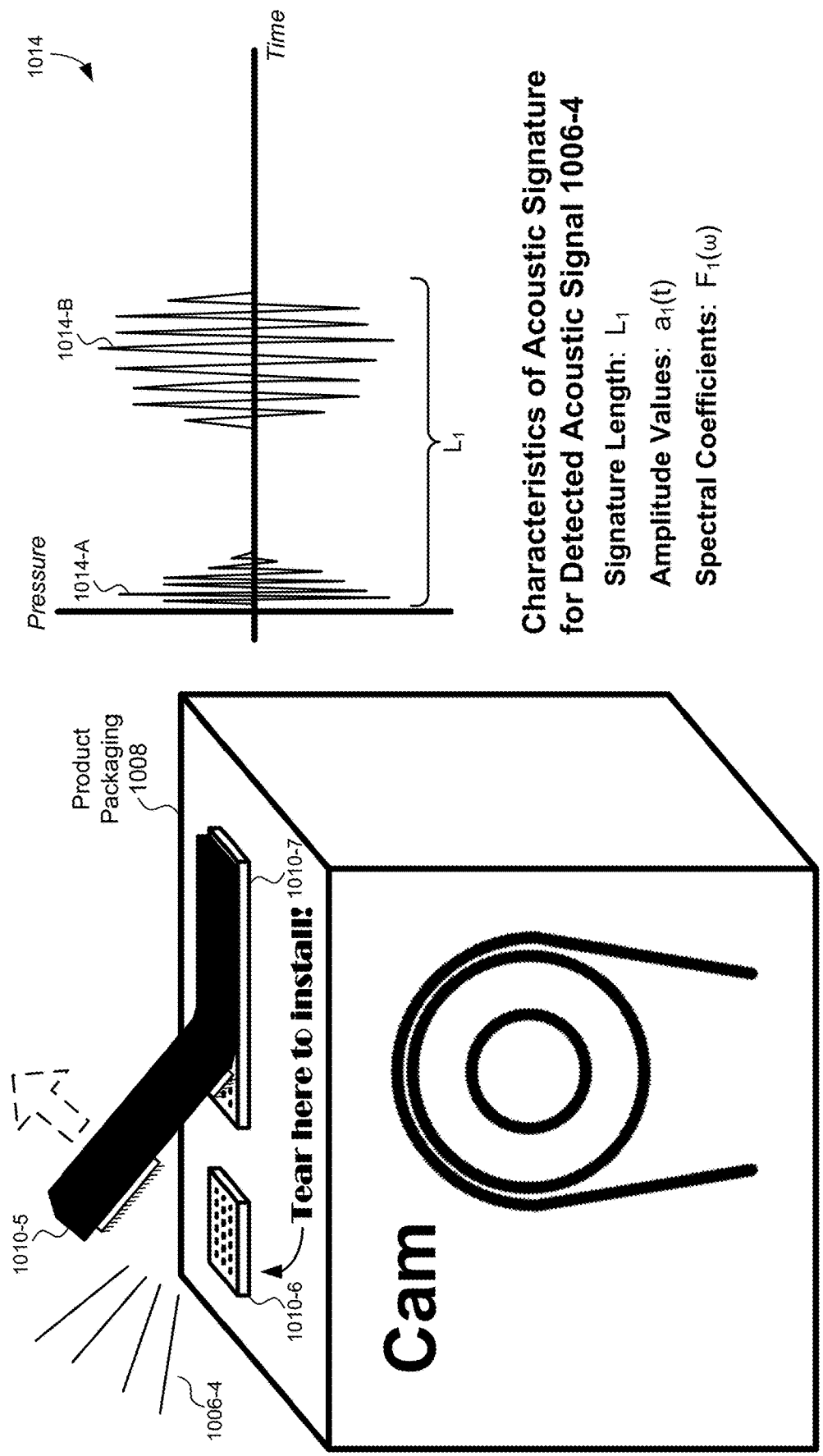
FIG. 12A illustrates a tag, a non-provisioned device, and an acoustic signature of a generated acoustic signal, in accordance with some implementations.

In another aspect, a user may seek to add a new device (e.g., a non-provisioned device) to the smart home environment 100, such as installing a new security camera. Affixed to the packaging 1008 of a new device is a tag that generates a predefined acoustic signal in response to physical motion of the tag. This may include tearing off an adhesive strip (or other packaging component) from the packaging 1008 of a new device while unboxing, where the adhesive strip generates an acoustic signal 1006-4 in response. An example of such a tag is shown in FIG. 12A.

As described above, acoustic signals generated in response to physical motion in this manner are characterized by acoustic signatures having measurable properties or characteristics. Through the use of such tags, various operations related to a provisioning or installation process of a new device may be triggered in response to detecting a predefined acoustic signal. For example, smart devices positioned throughout the smart home environment 100 can be used to detect and analyze acoustic signals generated by tearing off tags affixed to the packaging of a new device, and further cause execution of instructions for provisioning the new device, such as pairing the new device with an existing network of smart devices or executing installation software. Specifically, the acoustic signature of the detected acoustic signal is compared against a database of stored acoustic signatures, where the stored acoustic signatures are mapped to respective devices and sets of executable instructions for provisioning the devices. The use of tags therefore increases the ease with which new devices can be provisioned and installed.

FIG. 11A illustrates a tag, a monitored object, and an acoustic signature of a generated acoustic signal, in accordance with some implementations.

Specifically, a window 1002-1 from the smart home environment 100 of FIG. 10 is illustrated. Tags 1010 (e.g., tags 1010-1 through 1010-4, or collectively referred to as a single tag associated with the window 1002-1) are affixed with the window 1002-1 and a window frame. In response to a downward motion of the window 1002-1 as it is being closed, an acoustic signal 1006-1 having an acoustic signature 1012 is generated as the tag 1010-1 comes into contact with the tags 1010-2 through 1010-4. Particularly, the portions 1012-A, 1012-B, and 1012-C of the acoustic signature 1012 correspond to the acoustic signals generated as the tag 1010-1 comes into contact with the tags 1010-2, 1010-3, and 1010-4, respectively.

Objects that may be monitored in a given environment include openings and entryways (e.g., windows, doors, gates, fences, vents, etc.) through which one may gain access to a premises. Other objects that can be monitored include appliances (e.g., opening/closing of a dishwasher, laundry machine, stove, oven, HVAC, etc.) or other devices having multiple states (e.g., powering on/off of a television, sound system, window blinds, etc.). Objects may also include items of value, the position (e.g., secured position) or location of which a user may monitor by use tags for generating acoustic signals.

Monitored objects may assume a plurality of possible states (e.g., open, closed, partially open, etc.). A plurality of states may be related in that they correspond to a common state, but each of the plurality of states corresponds to a different degree of the common state (e.g., multiple opened states, where each state corresponds to a different percentage of a completely open state, such as 10% open, 20% open, etc.).

Tags 1010 include any passive (i.e., non-powered) objects, materials, or mechanisms that are manufactured and designed to generate acoustic signals having specific acoustic signatures. Tags 1010 may generate acoustic signals have specific acoustic properties in response to a particular type of physical contact or motion (e.g., rubbing, tearing, compression, expansion), or a particular magnitude thereof (e.g., a speed or force with which a window is closed). Tags 1010 may be manufactured using materials having specific acoustic properties. For example, tags 1010 may be an adhesive material, where the degree of adhesiveness has a corresponding amount of friction, and thus has a corresponding acoustic signal having a specific acoustic signature that results from physical contact. In this example, the degree of adhesiveness can therefore be adjusted to design acoustic signals having particular acoustic signatures. In FIG. 11A, the tags 1010 are constructed using a material having protruding fibers disposed across the surface of the tags, such that contact resulting from a tag touching and moving across the surface of another tag generates a particular sound (e.g., Velcro).

Physical properties of tags 1010, such as shape, size, thickness, length, position (e.g., with reference to objects or surfaces with which they come into contact), or other modifiable characteristics, may also be adjusted in such a way that a particular acoustic signal and acoustic signature are achieved. One or multiple tags 1010 may also be combined and placed in a particular arrangement in order to produce a particular acoustic signal. In the example shown, three tags 1010-2 through 1010-4 are positioned in a sequence such that the opening and closing of the window 1002-1 produces three sequential acoustic signals (or one collective acoustic signal) corresponding to portions 1012-A, 1012-B, and 1012-C of the acoustic signature 1012.

Other examples of tags 1010 include miniature instruments that produce predefined acoustic signals (e.g., bells, chimes, horns, whistles, wood blocks, forks, strings, etc.). In some implementations, tags 1010 are devices that generate a clicking noise in response to physical contact (e.g., a ratchet or clip having one or more angled prongs).

An acoustic signature is a time or frequency-domain representation of a corresponding acoustic signal. In particular, in the time-domain, an acoustic signature is a function a(t) that specifies an amplitude (e.g., sound pressure) of an acoustic signal measured at various times t over the length of the acoustic signal. The amplitude may be in units of pressure (pascal Pa), or output units (e.g., voltage V, current I, etc.) of an acoustic sensor that detects the acoustic signal (e.g., a microphone) and produces/outputs a corresponding signal. The amplitude may be expressed as a peak amplitude, a peak-to-peak amplitude, an average, or root mean square amplitude. Alternatively, the function a(t) may be expressed as a sound intensity I, defined by I=p*v (units of W·m−2, where p is the function a(t) measured in units of sound pressure and v is a particle velocity), or a sound pressure level (SPL) Lp, defined by Lp=20*log 10(p/p0) (measured in decibels, where p is the function a(t) measured in units of root mean square sound pressure and p0 is the reference sound pressure in air).

As shown in FIG. 11A, the acoustic signature 1012 has a signature length of L1 seconds. Portions 1012-A through 1012-C of the acoustic signature 1012 correspond to instances in time at which measurable sound pressure was detected by an acoustic sensor device, such as moments when the tags 1010-1 through 1010-4 made contact in response to the physical motion of closing or opening the window 1002-1.

An acoustic signature may also be expressed in the frequency-domain as a function F(ω) (e.g., by transforming the time-domain function using a variety of sound processing techniques, such as a Fourier Transform operation), where the respective values at various frequencies represent the magnitude of different tones (e.g., spectral coefficients) of the acoustic signal. That is, sound processing techniques may be applied to obtain a function F(ω), which decomposes the time-domain function a(t) into its constituent tones (e.g., sinusoidal functions of various frequencies that together compose the time-domain function) and specifies the relative dominance of those tones. The use of acoustic signatures in identifying monitored objects and their states is described in greater detail with respect to FIGS. 13A-13C.

FIG. 11B illustrates a table 1100 of acoustic signatures, in accordance with some implementations.

Entries of a database (e.g., table 1100) of acoustic signatures store data for identifying the states of various objects being monitored in an environment. An entry of the database specifies, but is not limited to: an object ID (e.g., unique identifier for a particular object being monitored, such as an entryway), an object type (e.g., windows, doorways, appliances, devices, etc.), a location (e.g., a specific room, region, etc. of a particular smart home environment), a corresponding state (e.g., open, closed, etc.), a current state, and/or characteristics of a corresponding acoustic signature, which include an acoustic signature length (i.e., length of detected sound), amplitude values (e.g., a function a(t) expressing the measured pressure of an acoustic signal with respect to time), spectral coefficients (e.g., a function F(ω) expressing magnitudes of different tones of the acoustic signal), a reference distance (i.e., a distance from the monitored object at which characteristic values for the acoustic signature would be detected), and/or a reference sensor (e.g., the sensor device that detected the acoustic signature during a training/database creation phase).

Table 1100 in FIG. 11B corresponds to various monitored objects in the smart home environment 100 of FIG. 10. As an example, the first entry specifies characteristics of an acoustic signature that would correspond to an "open" state of the window 1002-1 located in the living room (e.g., room 1000-1). The current states shown in table 1100 correspond to a moment in time before the acoustic signals 1006 in FIG. 10 were generated.

In some implementations, when an acoustic signal is detected in an environment (e.g., by a device having an acoustic sensor), one or more characteristics (e.g., acoustic length, amplitude values, etc.) of an acoustic signature of that signal are compared against entries of the table 1100. If a matching entry is found, a current state of a monitored object corresponding to the matching entry is updated based on a corresponding state specified by the matching entry. Thus, for example, if a detected acoustic signal has an acoustic signature matching the characteristics specified by entry 1 (e.g., an acoustic length L1, amplitude values expressed by function a1(t)), the current state of the window 1002-1 is updated (or maintained) to reflect the corresponding "open" state.

Figure 13B:
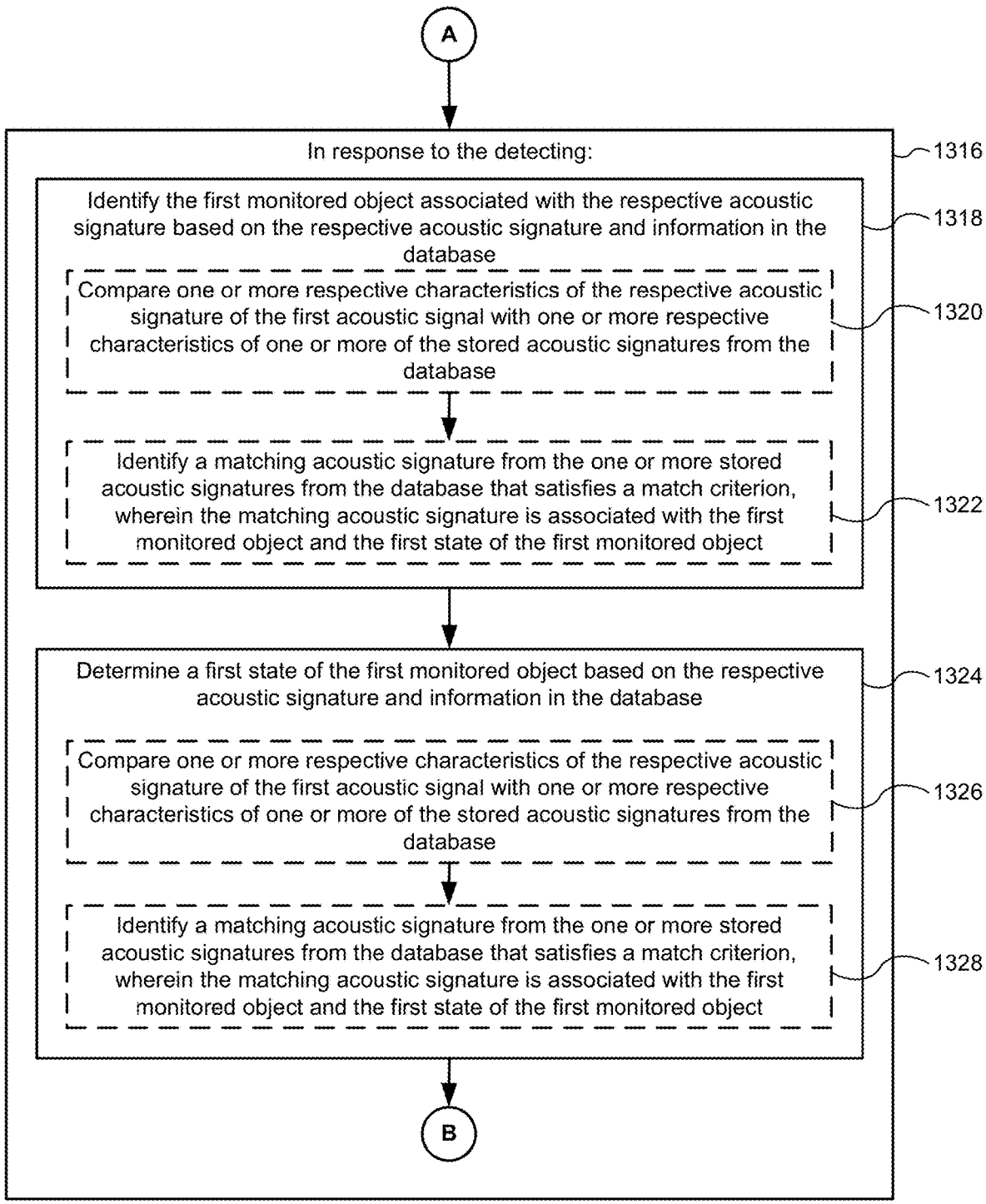
Figure 13C:
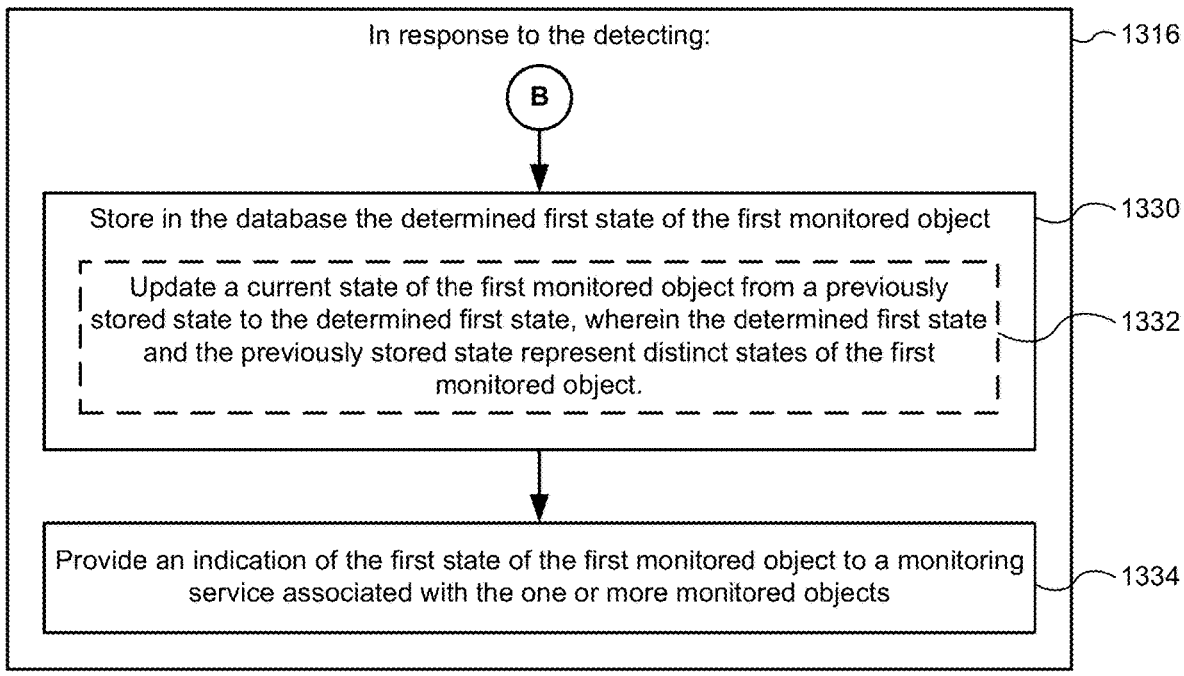

Information stored in the database, and its use in identifying monitored objects and their states, are described in greater detail with respect to FIGS. 13A-13C.

FIG. 12A illustrates a tag, a non-provisioned device, and an acoustic signature of a generated acoustic signal, in accordance with some implementations.

Specifically, a product packaging 1008 (FIG. 10) for a non-provisioned device is illustrated. Tags 1010 (e.g., tags 1010-5 through 1010-7, or collectively referred to as a single tag associated with a device to be provisioned) are affixed to product packaging 1008, intended for removal when a user seeks to install or otherwise configure a new device, such as a surveillance camera, for use in a smart home environment 100. In response to a motion in which the tag 1010-5 is torn off the product packaging 1008, an acoustic signal 1006-4 having an acoustic signature 1014 is generated. The portions 1014-A and 1014-B of the acoustic signature 1014 correspond to the acoustic signals generated as the tag 1010-5 is torn from the tags 1010-6 and 1010-7, respectively. Based on the acoustic signature 1014, a corresponding set of instructions for provisioning the device is executed.

Non-provisioned devices are devices (e.g., cameras 118, thermostats 102, hazard detectors 104, etc.) that have yet to be initialized with an environment in which they are to be installed. Instructions for provisioning a device may include, for example, pairing or associating an online user account with a non-provisioned device (e.g., a user account created with a service provided by a smart home provider server system 164, FIG. 1), establishing connectivity with other nearby devices in a smart home environment, or commencing an installation process for the non-provisioned device. Multiple tags 1010 corresponding to different sets of executable instructions may be used in association with the provisioning of a device, such as multiple tags being affixed to a product packaging. Additional examples of executable instructions related to provisioning are described with respect to FIGS. 14A-14C.

Various types of tags 1010 and physical properties that may be modified to generate specific acoustic signatures are described with respect to FIG. 11A. Various properties of acoustic signatures are also described with respect to FIG. 11A.

FIG. 12B illustrates a table 1200 of acoustic signatures, in accordance with some implementations.

Entries of a database (e.g., table 1200) of acoustic signatures store data for identifying a corresponding set of instructions to be executed for provisioning various devices in an environment. An entry of the database specifies, but is not limited to: a device type (e.g., surveillance cameras, smart thermostats, hazard detectors, etc.), a device model (e.g., manufacturer, model number, etc.), a set of executable instructions (e.g., register device with home system, commence pairing operation, etc.), and/or characteristics of a corresponding acoustic signature, which include an acoustic signature length (i.e., length of detected sound), amplitude values (e.g., a function a(t) expressing the measured pressure of an acoustic signal with respect to time), and spectral coefficients (e.g., a function F(ω) expressing magnitudes of different tones of the acoustic signal).

Table 1200 in FIG. 12B corresponds to various types of devices that may be provisioned for use in a smart home environment 100 (FIG. 10). As an example, the first entry specifies characteristics of an acoustic signature corresponding to executable instructions to register a camera device (e.g., a camera 118, FIG. 10) with a home system (e.g., smart home environment 100).

In some implementations, when an acoustic signal is detected in an environment (e.g., by a device having an acoustic sensor), one or more characteristics (e.g., acoustic length, amplitude values, etc.) of an acoustic signature of that signal are compared against entries of the table 1200. If a matching entry is found, a corresponding set of instructions is executed (e.g., by the non-provisioned device, by a device in the smart home environment with which the non-provisioned device is paired, etc.). For example, because detected acoustic signal 1006-4 (FIGS. 10 and 12A) has an acoustic signature 1014 that matches the characteristics specified by entry 1 (e.g., amplitude values expressed by function a1(t)), spectral coefficients expressed by function F1(ω)), instructions to register the non-provisioned camera device with the home system are executed.

Figure 14B:
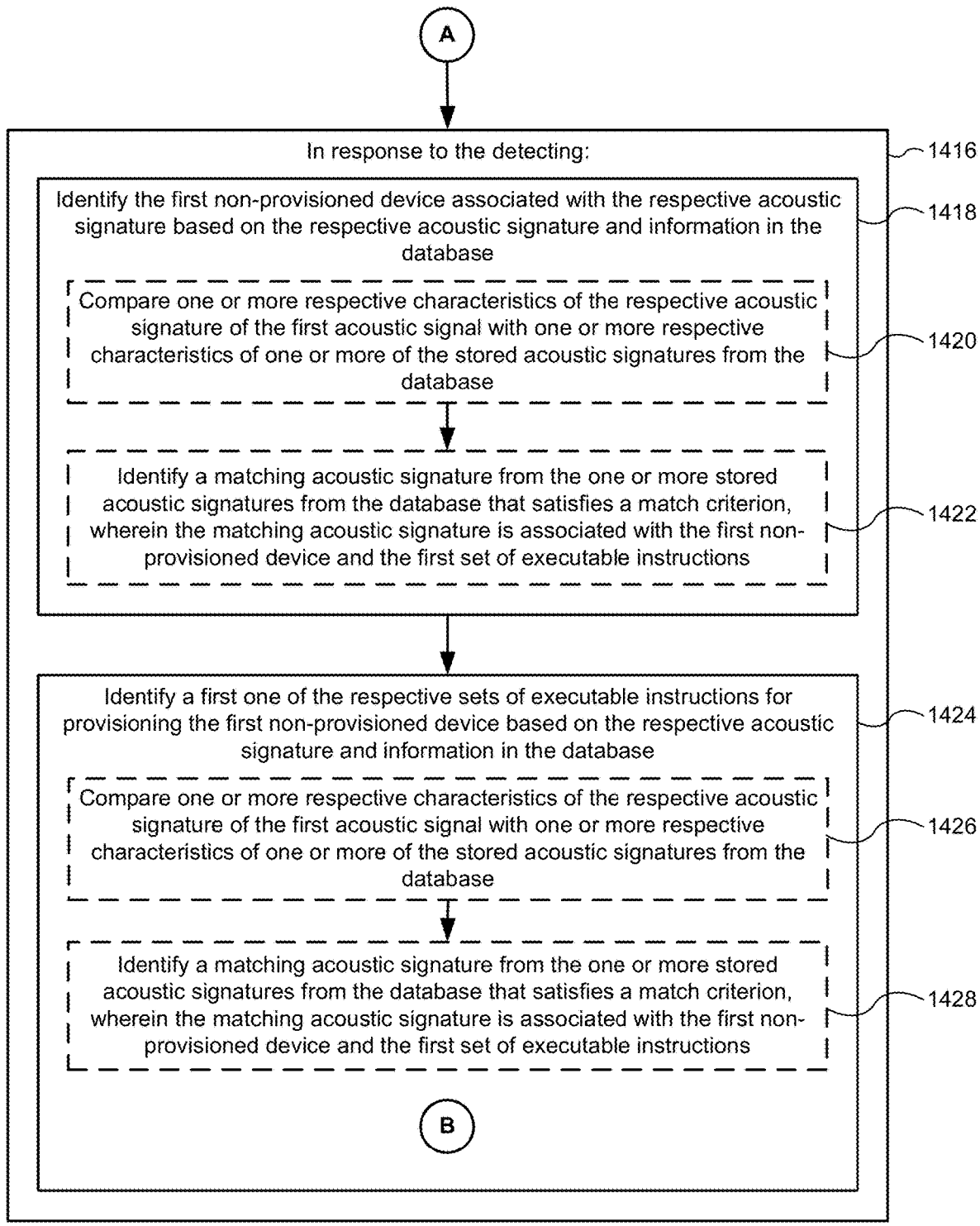
Figure 14C:
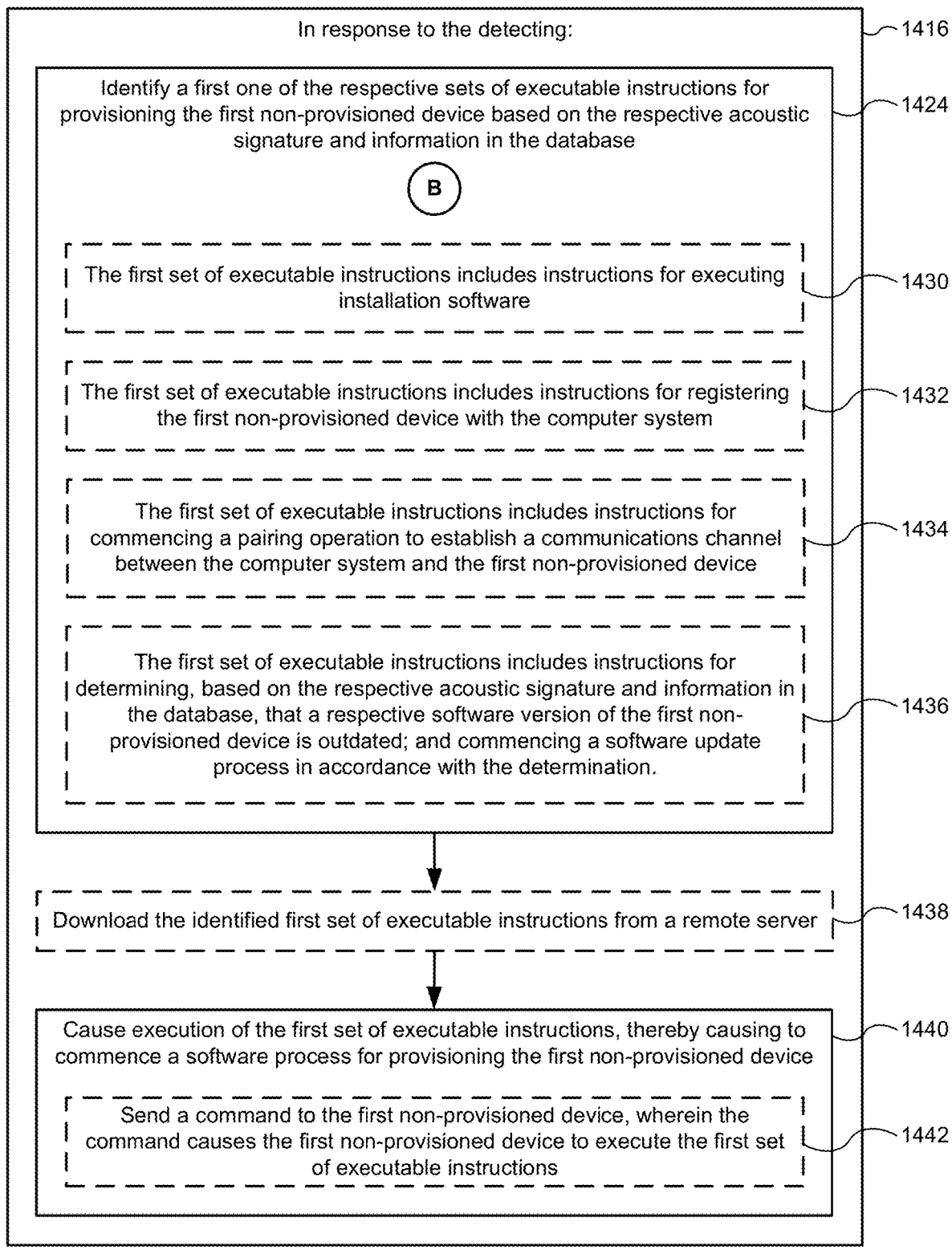

Information stored in the database, and its use in provisioning devices, is described in greater detail with respect to FIGS. 14A-14C.

FIGS. 13A-13C illustrate a flowchart representation of a method 1300 of identifying a monitored object and determining its state, in accordance with some implementations. In some implementations, the method 1300 is performed by one or more electronic devices of one or more systems (e.g., devices of a smart home environment 100, FIG. 1; smart devices 204 of smart home network 202, FIG. 2; etc.) and/or a server system (e.g., smart home provider server system 164, FIGS. 1 and 2). Thus, in some implementations, the operations of the method 1300 described herein are entirely interchangeable, and respective operations of the method 1300 are performed by any of the aforementioned devices, systems, or combination of devices and/or systems. For example, step 1304 (e.g., obtaining a database of stored acoustic signatures) may be performed by a thermostat 102, while step 1314 (e.g., detecting a first acoustic signal) may be performed by a camera 118 that is communicably coupled to the thermostat 102.

As an overview of the method 1300, in some implementations, the method is performed (step 1302, FIG. 13A) at a computer system having one or more processors and memory storing instructions for execution by the one or more processors, wherein the computer system is communicably coupled to one or more sensor devices. The computer system obtains (step 1304) a database of stored acoustic signatures characterizing predefined acoustic signals generated by passive tags in response to physical motion of respective monitored objects associated with the passive tags. A first acoustic signal characterized by a respective acoustic signature and generated by a first one of the passive tags is detected (step 1314). In response to detecting the first acoustic signal (step 1316, FIG. 13B), the first monitored object associated with the respective acoustic signature is identified (step 1318) based on the respective acoustic signature and information in the database, and a first state of the first monitored object is determined (step 1324) based on the respective acoustic signature and information in the database. Thereafter, the determined first state of the first monitored object is stored (step 1330, FIG. 13C) in the database, and an indication of the first state of the first monitored object is provided (step 1336) to a monitoring service associated with the one or more monitored objects. Various implementations of the method 1300 are described throughout and with respect to FIGS. 13A-13C.

The method 1300 is performed (1302) at a computer system (e.g., thermostat 102, FIG. 10) having one or more processors and memory storing instructions for execution by the one or more processors, wherein the computer system is communicably coupled to one or more sensor devices (e.g., wall plug 110, camera 118, hazard detector 104, etc., each equipped with respective acoustic sensors). FIGS. 13A-13C correspond to instructions stored in a computer memory or other computer-readable storage medium (e.g., respective memory 606 of the thermostat 102, and/or memory 606 of the camera 118 and hazard detector 104). In some implementations, the one or more sensor devices and the computer system are located within the same premises (e.g., referring to the example above, the wall plug 110, thermostat 102, camera 118, and hazard detector 104 are located within the same smart home environment 100, FIG. 10). In some implementations, the one or more sensor devices are components of the computer system (e.g., a thermostat having an acoustic sensor and an IR sensor).

In some implementations, the one or more sensor devices are located within a premises (e.g., hazard detector 104 and camera 118 in smart home environment 100, FIG. 10), the computer system is a remote server located outside of the premises (e.g., a smart home provider server system 164 that provides a security/monitoring service), and detecting (step 1304, FIG. 13A) the first acoustic signal comprises receiving, at the computer system and from the one or more sensor devices, the first acoustic signal. Thus, one or more devices of a smart home environment 100 are used to detect acoustic signals in the premises and send the detected signals to a remote server for processing (e.g., detecting the corresponding state of a monitored object).

In some implementations, the detecting (step 1304) is performed by a first one of the one or more sensor devices (e.g., camera 118 detects acoustic signal), and the identifying (step 1318, FIG. 13B) of the first monitored object and the determining (step 1324, FIG. 13B) of the first state are performed by the computer system (e.g., thermostat 102 analyzes detected acoustic signal).

Acoustic Signatures and their Characteristics

The computer system obtains (1304) a database of stored acoustic signatures characterizing predefined acoustic signals generated by passive tags in response to physical motion of respective monitored objects associated with the passive tags. An example of a database of stored acoustic signatures is illustrated and described with respect to FIG. 11B (e.g., table 1100).

In some implementations, obtaining (1304) the database includes accessing a database file/table (e.g., table 1100, FIG. 11B), or a portion thereof, stored in the memory of the computer system (e.g., memory 606 of smart device 204). In some implementations, obtaining the database includes retrieving a database file/table, or a portion thereof, from a remote server (e.g., smart home provider server system 164). In some implementations, obtaining the database includes obtaining a portion of a database file/table that corresponds to the sensor device that detected the acoustic signal being analyzed. For example, referring to FIG. 10, if wall plug 110 detects the acoustic signal 1006-2 generated by a tag associated with the door 1004, entries of the database that list the wall plug 110 as the reference sensor (i.e., the device that recorded the corresponding acoustic signature during a configuration process) are retrieved. In this example, based on the table 1100 in FIG. 11B, entries 1, 2, and 5 would be retrieved and compared against in object identification and state determination processes.

In some implementations, a first one of the passive tags comprises (1306) a material configured to generate a first acoustic signal in response to physical contact when physically moved in a predetermined manner. In some implementations, the material of the first passive tag is a Velcro material. Alternatively, the material may be an adhesive material, or a material whose surface exhibits a predetermined degree of friction. In some implementations, the first passive tag is configured to generate acoustic signals having substantially the same acoustic signatures in response to physical movement that is substantially the same. By designing passive tags in this way, consistent sound signatures are generated and the states of monitored objects may be accurately tracked. Passive tags are described in detail with respect to FIG. 11A.

In some implementations, at least some of the respective monitored objects associated with the passive tags are (1308) entryways of a premises (e.g., windows 1002-1 and 1002-2, door 1004, FIG. 10).

In some implementations, acoustic signatures, which include the stored acoustic signatures in the database and a respective acoustic signature of a first acoustic signal (detected in step 1314), are respectively defined (1310) by one or more characteristics of acoustic signatures. The characteristics include at least one of an acoustic signature length, one or more amplitude values (sound pressure, or other acoustic measurements such as sound intensity, sound pressure level, etc.), and one or more spectral coefficients for one or more respective frequencies. For example, an acoustic signature for entry 2 of the table 1100 is illustrated in FIG. 11A, and is defined by an acoustic signature length L1, amplitude values expressed as function $a1(t)$, and spectral coefficients expressed as function $F1(\omega)$.

In some implementations, acoustic signatures are defined by patterns of detected sound, where the pattern represents points in time (over the length of an acoustic signature) at which sound is detected, irrespective of the particular amplitude. A pattern defining an acoustic signature may, for example, consist of a sequence of time points corresponding to detected sounds (e.g., sequence of three clicks, each click being detected 1 second apart). Defining acoustic signatures using basic acoustic patterns provides a simplified expression of a detected acoustic signal, which may expedite processing (e.g., object and state identification) and minimize processing requirements (e.g., forego use of signal processing techniques that decompose a time-domain signal into frequency components).

In some implementations, at least some of the stored acoustic signatures are defined by one or more of the characteristics excluding amplitude values. In other words, stored acoustic signatures are preconfigured only with respect to spectral coefficients, signature length, and/or acoustic patterns. Consequently, object identification and state determination are independent of volume.

In some implementations, at least some of the stored acoustic signatures are partially distinct with respect to at least one of the respective one or more characteristics by which they are defined (e.g., some have same acoustic signature lengths, but different amplitudes values and spectral coefficients). In some implementations, all stored acoustic signatures are completely distinct (i.e., each stored acoustic signature is defined by unique set of one or more characteristics).

In some implementations, each or any combination of the one or more characteristics (e.g., acoustic signature length, amplitude values, spectral coefficients, acoustic patterns, etc.) respectively defining the stored acoustic signatures is associated (1312) with: a respective object (e.g., window 1002-1, FIG. 10), a type of object (e.g., window, door, washing machine, etc.), a state or change of state for a respective object (e.g., open/close state, or state toggle, for the window 1002-1), a state or change of state for a respective type of object (e.g., open/close state, or state toggle, for a window), and/or a location (e.g., room 1000-1, a particular environment/premises of multiple environments associated with a user, etc.). That is, characteristics of an acoustic signature may be selectively mapped to particular aspects of a monitored object.

For example, referring to table 1100 in FIG. 11B, the acoustic signature for entry 3 is defined by an acoustic signature length L3, amplitude values expressed as function $a3(t)$, and spectral coefficients expressed as function $F3(\omega)$, where the combination of characteristics is associated with and mapped to an open state of the door 1004 (FIG. 10) located in room 1000-1. In another example, the acoustic signature length and spectral coefficients of an acoustic signature are associated with and mapped to a state for a type of object (e.g., the opening of windows), while the amplitude is associated with a particular one of those objects (e.g., a signature with greater amplitude values corresponds to a window that is closer to a sensor device that detected the acoustic signal, while a signature with smaller amplitude values corresponds to window that is farther away).

In some implementations, respective amplitude values defining at least some of the stored acoustic signatures are associated with distinct locations. That is, the amplitude (i.e., general sound intensity) of a detected acoustic signal can be used to determine a corresponding location (e.g., a particular room) in which the signal was detected. Based on the determined location, and information that specifies which objects are being monitored at that location, an associated object and its state is deduced.

In some implementations, a first one of the stored acoustic signatures is defined by respective one or more characteristics that are uniquely associated with a particular object, and a particular state of the particular object. Stated another way, the particular characteristics defining the first stored acoustic signature only correspond to the particular object and the particular state, and the particular object and the particular state only correspond to the first stored acoustic signature. Given the one-to-one mapping in such implementations, ambiguities that may arise in identifying an object and its state are more easily resolved. In some implementations, each stored acoustic signature in the database is uniquely associated with particular object and state of the object.

In some implementations, each of the stored acoustic signatures is associated with a respective reference distance. A reference distance is a distance from a monitored object at which an acoustic signal, generated by physical motion of the monitored object and characterized by a respective acoustic signature, would be detected. For example, referring to FIG. 11B, the characteristics of an acoustic signature in entry 1 of the table 1100 are associated with a reference distance d1, which is a distance from window 1002-1 at which the characteristics of the acoustic signature (e.g., a1($t$), F1($\omega$)) would be detected. In some cases, the reference distance is used in combination with the distance between a sensor and each monitored object to distinguish between objects (e.g., by applying compensation techniques, as described in greater detail with respect to steps 1318 and 1324, FIG. 13B).

In some implementations, each of the stored acoustic signatures is associated a respective sensor device that detected a respective acoustic signal characterized by the respective acoustic signature during a configuration process (during which one or more entries of the database are created). For example, the acoustic signatures may be associated with respective sensor devices and their specific hardware/software capabilities (e.g., microphone sensitivity). In some implementations, the respective reference distance corresponds to a distance of the respective monitored object from a respective sensor device that detected the respective acoustic signal during a configuration process (e.g., referring to entry 1 of the table 1100 in FIG. 11B, reference distance d1 is the distance between the window 1002-1 and the wall plug 110, as shown in FIG. 10).

Creating Database of Acoustic Signatures

In some implementations, the database of stored acoustic signatures is predefined irrespective of the environment that includes the respective monitored objects. For example, the database may be provided by a manufacturer of the passive tags, where the database specifies acoustic signatures and corresponding objects and object states without a user needing to configure devices for use with the tags.

In additional and/or alternative implementations, a configuration process is performed to create the database of stored acoustic signatures. That is, prior to obtaining the database, one or more entries of the database of stored acoustic signatures are created. Creating the one or more entries includes detecting the predefined acoustic signals, each of the predefined acoustic signals characterized by a respective stored acoustic signature, and generated by a respective passive tag in response to physical motion of a respective object associated with the respective passive tag. Furthermore, creating the one or more entries includes, for each predefined acoustic signal that was detected, associating the respective stored acoustic signature with: the respective object, and a state of the respective object resulting from the physical motion of the respective object.

As an example, referring to the smart home environment 100 of FIG. 10, a configuration process is performed so that the smart home environment 100 is configured to recognize the opening/closing of a door 1004 based on an acoustic signal 1006-2 generated by an associated tag when the door 1004 is opened/closed. This configuration process includes using one or more devices equipped with acoustic sensors, such as a camera 118 that includes a microphone, to detect the acoustic signal 1006-2 generated in response to the door 1004 being opened or closed. Thereafter, based on the corresponding state of the door 1004, an entry is created in a database (e.g., stored in the memory of the camera 118) that specifies characteristics of an acoustic signature of the detected acoustic signal 1006-2 and associates those characteristics with an open/closed state of the door 1004. An example is shown in table 1100 of FIG. 11B, where entries 3 and 4 specify characteristics (e.g., acoustic signature length, amplitude values, spectral coefficients) of corresponding acoustic signatures, and are associated with the open and closed states of the door 1004, respectively.

In some implementations, creating the one or more entries includes specifying the sensor device that detected an acoustic signal having a particular acoustic signature during the configuration process (and optionally a distance of the sensor device from the object/tag). Thus, for example, assuming that multiple sensor devices were actively listening during a configuration process, a respective entry would be created for each of the active sensor devices in response to a particular physical motion of an object, and each entry may have at least a partially distinct acoustic signature (e.g., depending on the position and/or acoustic sensitivity of the respective sensor device). Thus, respective entries for a given object and its state—although corresponding to the same acoustic signal generated in response to the same physical motion during the configuration process—may include partially different acoustic signatures depending on the corresponding device that detected the acoustic signal (e.g., entries for devices positioned in different rooms may have different amplitude values for the same object/state).

In some implementations, detecting the predefined acoustic signals during the configuration process includes detecting each of the predefined acoustic signals in response to a respective object being physically moved once (e.g., one or more sensor devices begin actively listening, and a user physically moves the object/tag being configured once). In some implementations, a monitored object being configured is moved multiple times such that the tag generates multiple acoustic signals having respective acoustic signatures. Detected acoustic signals and signatures associated with the same object and corresponding state may be stored as separate, related entries, or alternatively may be consolidated and stored as a single entry in the database (e.g., determine an average, median, maximum, minimum, etc. for the multiple acoustic signatures).

In some implementations, associating the respective stored acoustic signature comprises requesting authorization to associate the respective stored acoustic signature with the respective object and the state of the respective object, and performing the associating in response to receiving the authorization. As an example, requesting authorization to associate may include displaying a message on a user interface confirming association of a detected acoustic signal with a particular object and state, where a corresponding entry is created in the database in response to detecting a user input confirming the association.

Identifying a Monitored Object and Determining its State

A first acoustic signal characterized by a respective acoustic signature and generated by a first one of the passive tags is detected (1314). For example, an acoustic signal 1006-1 in FIG. 10 is detected in response to the window 1002-1 being closed. In some implementations, the first acoustic signal is detected by the computer system (e.g., a thermostat 102 equipped with an acoustic sensor), and/or by the one or more sensor devices communicably coupled to the computer system (e.g., camera 118, equipped with an acoustic sensor and communicably coupled to the thermostat 102). In some implementations, multiple sensor devices detect the first acoustic signal (e.g., camera 118, thermostat 102, and wall plug 110, FIG. 10).

Referring now to FIG. 13B, in response to detecting the first acoustic signal (1316), and based on the respective acoustic signature (e.g., acoustic signature 1012, FIG. 11A) and information in the database (e.g., table 1100, FIG. 11B), a first one of the monitored objects associated with the respective acoustic signature is identified (1318), and a first state of the first monitored object is determined (1324).

In some implementations, identifying the first monitored object and/or determining the first state of the first monitored object comprises (steps 1320, 1326) comparing one or more respective characteristics (e.g., acoustic signature length, amplitude values, spectral coefficients, etc.) of the respective acoustic signature of the first acoustic signal with one or more respective characteristics of one or more of the stored acoustic signatures from the database. A matching acoustic signature that satisfies a match criterion is identified (steps 1322, 1328) from the one or more stored acoustic signatures from the database, wherein the matching acoustic signature is associated with the first monitored object and the first state of the first monitored object. For example, referring to FIG. 11A, the acoustic signature 1012 (of an acoustic signal 1006-1 generated by the tags 1010-1 through 1010-4 in response to the window 1002-1 being closed) is defined by an acoustic signature length L1, amplitude values expressed by function $a1(t)$, and spectral coefficients $F1(\omega)$. One or more of these characteristics are then compared to the entries of the table 1100 in FIG. 11B. Given the match between characteristics of the acoustic signature 1012 and values of entry 2, a closed state of the window 1002-1 is determined.

In some implementations, the match criterion specifies one or more thresholds for one or more respective characteristics of acoustic signatures. The match criterion and the specified thresholds represent a similarity requirement between the acoustic signature of a detected signal and the stored signatures in the database being compared against. The one or more thresholds may be defined as a percentage of or deviation from respective values stored in database (e.g., amplitude values of acoustic signature for detected signal and a stored signature must be within 10% of the respective values for the stored signature). The match criterion may specify one threshold (e.g., a threshold for amplitude values) or multiple thresholds (e.g., respective thresholds for acoustic signature length and spectral coefficients). In some implementations, respective thresholds for respective characteristics are distinct (e.g., different thresholds for amplitude values and spectral coefficients).

In some situations, the physical motion of a monitored object varies based on a number of factors. For instance, a window may be closed at different speeds or with different amounts of force, possibly resulting from the unique tendencies of the individual who causes the physical motion. As a result, the length of the acoustic signature or the amplitude values (e.g., volume) characterizing an acoustic signal generated by a tag may vary. To account for these variations and to accurately compare against stored acoustic signatures, in some implementations, a compensated acoustic signature for the first acoustic signal is obtained by scaling (e.g., shrinking/expanding) a respective acoustic signature length of the first acoustic signal to match at least a first acoustic signature length defining a first one of the stored acoustic signatures in the database. In some implementations, the compensated acoustic signature includes proportionally scaled amplitude values and/or spectral coefficients of the acoustic signature. Identifying (1318) the first monitored object and determining (1324) the first state of the first monitored object are then performed based on the compensated acoustic signature and the information in the database.

In addition to characteristics of the acoustic signature of the detected acoustic signal, supplementary information may be used for identifying the first monitored object and/or determining the first state of the first monitored object. That is, in some implementations, identifying (1318) the first monitored object and/or determining (1324) the first state of the first monitored object is further based on one or more additional inputs received from the one or more sensor devices communicably coupled to the computer system (or received from other devices distinct from the one or more sensor devices). In some implementations, the one or more additional inputs are associated with a time at which the first acoustic signal is detected. In some implementations, the one or more additional inputs are retrieved from (or transmitted by) the one or more sensor devices in response to detecting the first acoustic signal.

In some implementations, the one or more sensor devices include a camera device (e.g., camera 118, FIG. 10), and the one or more additional inputs include video data associated with the detected first acoustic signal. For example, a recorded video clip of a room in which an acoustic signal was detected may be processed and used to confirm a change in state of a monitored object (e.g., in FIG. 10, video footage captured by camera 118 indicates that the door 1004 is open, thus confirming a determined state change).

In some implementations, the one or more additional inputs include current presence detection data associated with the detected first acoustic signal. For example, if the hazard detector 104 in FIG. 10 determines (e.g., using IR sensors) that a user is present in the room 1000-2 in which the acoustic signal 1006-3 is detected, a higher likelihood is attributed to the possibility of a state change for the window 1002-2.

In some implementations, the one or more sensor devices include a thermostat device (e.g., thermostat 102, FIG. 10), and the one or more additional inputs include temperature data associated with the detected first acoustic signal. For example, a sudden fluctuation in temperature detected by a device in the same room in which an acoustic signal is detected may be used to confirm a suspected change in state (e.g., in FIG. 10, thermostat 102 detecting fluctuation in temperature resulting from window 1002-2 being opened).

In some implementations, the one or more sensor devices include an acoustic sensor, and the one or more additional inputs include additional acoustic data associated with the detected first acoustic signal. As an example, detected ambient noise, or changes thereof, may be used to deduce a monitored object (and state) to which the detected acoustic signal corresponds (e.g., in FIG. 10, heightened noise levels detected by thermostat 102 due to wind suggests an open state change of a nearby entryway).

In some implementations, the one or more additional inputs include a user input confirming the first state of the first monitored object. For example, in response to detecting the first acoustic signal, a user is prompted with message on a display interface (e.g., on a client device 504, FIG. 10) requesting confirmation of a state of a monitored object.

In some implementations, the one or more additional inputs include contextual data that includes at least one of a date and/or time at which, a geographical location at which, or a temperature reading obtained when, the first acoustic signal was detected. For example, if an acoustic signal is detected at night during winter months in a location that frequently snows, a higher likelihood is attributed to the possibility that a corresponding entryway, such as a window, is being closed, rather than opened.

In some implementations, the one or more additional inputs include a location of a respective sensor device of the one or more sensor devices that detected the first acoustic signal. That is, if one or more characteristics of an acoustic signature satisfy a threshold, a corresponding location of the detected acoustic signal may be deduced based on the location of the device that detected the acoustic signal. For example, an acoustic signal (and thus, the monitored object to be identified) is in the same location as the sensor device if amplitude values for the detected acoustic signal are greater than or equal to a threshold value (and conversely, an acoustic signal (and thus, the monitored object to be identified) is in a different location as the sensor device if amplitude values for the detected acoustic signals are less than a threshold value.

The location of the respective sensor device that detected the first acoustic signal may be used in additional and/or alternative implementations. Particularly, in some situations, identical tags that generate signals having substantially the same acoustic signature (when detected from the same reference distance) are used throughout a given smart home environment to monitor the states of different objects. Because monitored objects in these cases might only be distinguished based on their relative distances from sensor devices, objects and their states may be identified by using a compensated acoustic signature that is based on the location of the respective sensor device that detected the acoustic signal. That is, in some implementations, a compensated acoustic signature for the first acoustic signal is obtained by scaling one or more characteristics (e.g., amplitude values) of the respective acoustic signature (of the detected first acoustic signal) in accordance with a distance between the respective sensor device and the first passive tag that generated the first acoustic signal. Identifying (1318) the first monitored object and determining (1324) the first state of the first monitored object are then performed based on the compensated acoustic signature and the information in the database. To scale characteristics of an acoustic signature, a respective scaling coefficient is first calculated for each sensor device with respect to stored entries of the database. Scaling coefficients are calculated using a non-linear equation (e.g., inverse square law, assuming no reflections or reverberation) that accounts for a difference between a reference distance dref for an acoustic signature (i.e., a distance from a monitored object at which corresponding characteristic values for the acoustic signature would be detected) and a distance dsensor of the sensor device from the tag generating the acoustic signal. For amplitude values measured in units of sound pressure, the scaling coefficient is defined as (dref/dsensor), whereas for sound intensity, the scaling coefficient is defined as (dref dsensor)2. Using calculated scaling coefficients, characteristics of an acoustic signature for a detected acoustic signal are either amplified or shrunk to obtain the compensated acoustic signature. If the compensated acoustic signature matches the reference signature, then a corresponding object and its state are confirmed.

Referring now to FIG. 13C, after identifying (1318) the first monitored object and determining (1324) the first state of the first monitored object, the determined first state of the first monitored object is stored (1332) in the database.

In some implementations, storing (1330) the determined first state comprises (1332) updating a current state of the first monitored object from a previously stored state to the determined first state, wherein the determined first state and the previously stored state represent distinct states of the first monitored object. For example, the table 1100 in FIG. 11B includes a current state field, indicating a current state for a monitored object associated with a particular entry. Entries 1 and 2 indicate that a current state of the window 1002-1 is open. Thus, if an acoustic signature of a detected acoustic signal corresponds to the stored acoustic signature of entry 2, the new state of the window 1002-1 is determined to be closed, and the current state fields for any entries corresponding to the window 1002-1 are updated to "Closed."

In some implementations, a current state of the first monitored object in the database is a previously stored state, and storing in the database the determined first state of the first monitored object comprises maintaining the current state, wherein the determined first state and the previously stored state are the same. In order words, the respective acoustic signature corresponds to only one particular state of a respective object. Thus, in response to detecting subsequent acoustic signals having the same respective acoustic signature, the current state of the object remains unchanged.

Rather than storing multiple acoustic signatures that correspond to different states of a monitored object, in alternative implementations, only one acoustic signature is maintained for an object. Thus, detecting an acoustic signal characterized by the acoustic signature toggles a current state of the object. In these implementations, after updating (step 1332) the current state of the first monitored object to the determined first state from the previously stored state, a second acoustic signal is detected that is characterized by the same respective acoustic signature as the first acoustic signal, and generated by the first passive tag (e.g., the same first tag generates another acoustic signal that has the same acoustic signature). In response to detecting the second acoustic signal, and based on the respective acoustic signature and information in the database, the first monitored object associated with the respective acoustic signature is identified, and the current state of the first monitored object is updated from the first state to the previously stored state. Thus, only one acoustic signature is maintained, and in response to detecting an acoustic signal having the acoustic signature, the state of a corresponding object toggles. An example is shown in entry 5 of table 1100 (FIG. 11B).

An indication of the first state of the first monitored object is provided (1334) to a monitoring service associated with the one or more monitored objects. In some implementations, the monitoring service is an application on an associated client device (e.g., client device 504, FIG. 7). In some implementations, the monitoring service is provided by the computer system and/or the one or more communicably coupled sensor devices. In some implementations, the monitoring service is provided by a remote server distinct from the computer system (e.g., smart home provider server system 164, FIG. 1). The indication may be a visual (e.g., alert displayed on a client device 504), audible (e.g., a chime), and/or other sensory indication (e.g., tactile feedback on a client device 504).

In some implementations, the first state corresponds to a change of state for the first monitored object, and the computer system causes a device communicably coupled to the computer system to activate in response to the change of state. For example, referring to FIG. 10, in response to detecting an open state of a door 1004, a command may be sent to the nearest surveillance camera (e.g., camera 118) to begin capturing video. As another example, in response to detecting an open state of a window, a command may be sent to the nearest surveillance camera to begin capturing video.

FIGS. 14A-14C illustrate a flowchart representation of a method 1400 of identifying a non-provisioned device and a set of executable instructions for provisioning the non-provisioned device, in accordance with some implementations. In some implementations, the method 1400 is performed by one or more electronic devices of one or more systems (e.g., devices of a smart home environment 100, FIG. 1; smart devices 204 of smart home network 202, FIG. 2; etc.) and/or a server system (e.g., smart home provider server system 164, FIGS. 1 and 2). Thus, in some implementations, the operations of the method 1400 described herein are entirely interchangeable, and respective operations of the method 1400 are performed by any of the aforementioned devices, systems, or combination of devices and/or systems. For example, step 1404 (e.g., obtaining a database of stored acoustic signatures) may be performed by a thermostat 102, while step 1414 (e.g., detecting a first acoustic signal) may be performed by a camera 118 that is communicably coupled to the thermostat 102.

As an overview of the method 1400, in some implementations, the method is performed (step 1402, FIG. 14A) at a computer system having one or more processors and memory storing instructions for execution by the one or more processors, wherein the computer system is communicably coupled to one or more sensor devices. The computer system obtains (step 1404) a database of stored acoustic signatures characterizing predefined acoustic signals generated by passive tags in response to physical motion of the passive tags, wherein the passive tags are associated with non-provisioned devices, and wherein the acoustic signatures are associated with respective sets of executable instructions for provisioning the non-provisioned devices. A first acoustic signal characterized by a respective acoustic signature and generated by a first one of the passive tags is detected (step 1414). In response to detecting the first acoustic signal and based on the respective acoustic signature and information in the database, a first one of the non-provisioned devices associated with the respective acoustic signature is identified (step 1418, FIG. 14B) and a first one of the respective sets of executable instructions for provisioning the first non-provisioned device is identified (step 1424). Thereafter, the computer system causes (step 1440, FIG. 14C) execution of the first set of executable instructions, thereby causing to commence a software process for provisioning the first non-provisioned device. Various implementations of the method 1400 are described throughout and with respect to FIGS. 14A-14C.

The method 1400 is performed (1402) at a computer system (e.g., thermostat 102, FIG. 10) having one or more processors and memory storing instructions for execution by the one or more processors, wherein the computer system is communicably coupled to one or more sensor devices (e.g., camera 118 and hazard detector 104, each equipped with respective acoustic sensors). FIGS. 14A-14C correspond to instructions stored in a computer memory or other computer-readable storage medium (e.g., memory 606 of the thermostat 102, and/or memory 606 of the camera 118 and hazard detector 104). Various implementations of the computer system and one or more sensors devices are described in detail with respect to the method 1300 (FIG. 13A).

Acoustic Signatures and their Characteristics

The computer system obtains (1404) a database of stored acoustic signatures characterizing predefined acoustic signals generated by passive tags in response to physical motion of the passive tags (e.g., table 1200, FIG. 12B). The passive tags are associated with non-provisioned devices, and the acoustic signatures are associated with respective sets of executable instructions for provisioning the non-provisioned devices. Provisioning (or installing, initializing, configuring, etc.) a device may include one or a series of steps for enabling a device to operate within and/or communicate with other devices in an environment. In some implementations, provisioning comprises (1406) pairing or associating an online user account with a respective identifier of a non-provisioned device (e.g., registering a new device with a smart home environment, or a service provided for a smart home environment). Various instructions for provisioning are described in greater detail below with respect to FIG. 14C.

In some implementations, obtaining the database includes accessing a database file/table (e.g., table 1200, FIG. 12B), or a portion thereof, stored in the memory of the computer system (e.g., memory 606 of smart device 204, FIG. 6). In some implementations, obtaining the database includes retrieving a database file/table, or a portion thereof, from a remote server (e.g., smart home provider server system 164). In some implementations, the database of stored acoustic signatures is predefined irrespective of the environment in which a non-provisioned device is to be provisioned. For example, the database may be predefined and provided by manufacturers of the non-provisioned devices that use the passive tags (e.g., Manufacturer A provides a database of acoustic signatures for the different devices it manufacturers).

In some implementations, the first passive tag is (1408) a component of a packaging associated with the first non-provisioned device (e.g., adhesive material, perforated material for tearing off, etc.). An example is shown in FIG. 12A, where the tags 1010-4 through 1010-6 are affixed to the product packaging 1008 and generate an acoustic signal 1006-4 in response to being torn off. In some implementations, the first passive tag is a component of the first non-provisioned device itself (e.g., reusable mechanism integrated into the physical device packaging). In some implementations, the first passive tag comprises a material configured to generate the first acoustic signal in response to physical contact when physically moved in a predetermined manner. Various implementations of passive tags are described in detail with respect to FIG. 11A.

In some implementations, acoustic signatures, which include the stored acoustic signatures in the database and a respective acoustic signature of a first acoustic signal (detected in step 1414), are respectively defined by one or more characteristics of acoustic signatures. The characteristics include at least one of an acoustic signature length, one or more amplitude values (or other acoustic measurements, such as sound intensity, sound pressure level, etc.), and one or more spectral coefficients for one or more respective frequencies. An example is shown in FIG. 12B, where an acoustic signature for entry 1 is defined by an acoustic signature length L1, amplitude values expressed as function a1($t$), and spectral coefficients expressed as function F1($\omega$). Various implementations of acoustic signatures and their characteristics are described in greater detail with respect to the method 1300 (FIG. 13A).

In some implementations, each or any combination of the one or more characteristics (e.g., acoustic signature length, amplitude values, spectral coefficients, acoustic patterns, etc.) respectively defining the stored acoustic signatures is associated (1410) with: a device type (e.g., camera devices, thermostats, etc.) and/or a respective set of executable instructions (e.g., commence pairing operation). Each or any combination of the one or more characteristics respectively defining the stored acoustic signatures may also be associated with device specifications of a non-provisioned device (e.g., device manufacturer, model, year of manufacture, revision, etc.). Characteristics of an acoustic signature may therefore be selectively mapped to particular aspects of a non-provisioned device.

For example, referring to table 1200 in FIG. 12B, the acoustic signature for entry 1 is defined by an acoustic signature length L1, amplitude values expressed as function a1($t$), and spectral coefficients expressed as function F1($\omega$), where the combination of characteristics is associated with and mapped to Model A of a camera device (e.g., camera 118) manufactured by Manufacturer A, and is also associated with instructions to register the camera device with a home system. As another example, referring to entries 1 and 2 of the table 1200, the acoustic signature length L1 is associated with and mapped to a particular device type (e.g., camera devices) and set of instructions (e.g., register device with home system), while the respective combination of amplitude values and spectral coefficients are mapped to particular models of the camera device (e.g., $a1(t)$ and $F1(\omega)$ mapped to Manufacturer A and Model A, while $a2(t)$ and $F2(\omega)$ mapped to Manufacturer B and Model X).

In some implementations, a first one of the stored acoustic signatures is defined by respective one or more characteristics that are uniquely associated with a particular device type and a particular set of executable instructions (i.e., the particular characteristics defining the first acoustic signature only correspond to the particular device type and the particular set of executable instructions, and the particular device type and the particular set of executable instructions only correspond to the first acoustic signature).

In some implementations, each or any combination of the one or more characteristics respectively defining the stored acoustic signatures is associated with a respective stage of a plurality of stages of the software process for provisioning the first non-provisioned device. For example, a first acoustic signature (corresponding to an acoustic signal generated by a first tag) is associated with instructions for loading a software installation program on the non-provisioned device, while a second acoustic signature (corresponding to an acoustic signal generated by a second tag) is associated with instructions for connecting the non-provisioned device to a local Wi-Fi network after the software installation program has been loaded.

In some implementations, each or any combination of the one or more characteristics respectively defining the stored acoustic signatures is associated with a location in which a respective non-provisioned device is configured to operate. For example, different acoustic signatures may be used to allow a user to designate a room for installing a non-provisioned device (e.g., one tag for installing the non-provisioned device in a bedroom, a different tag for installing the non-provisioned device in a living room, etc.).

In some implementations, each or any combination of the one or more characteristics respectively defining the stored acoustic signatures is associated with a device type with which the non-provisioned device is to be integrated through provisioning. For example, a first acoustic signature may be used for integrating a camera device with a personal computer system, while a distinct second acoustic signature may be used for integrating a camera device with a smart home environment that comprises a plurality of other smart devices.

In some implementations, each or any combination of the one or more characteristics respectively defining the stored acoustic signatures is associated with a software package version for a respective set of executable instructions. In some implementations, each or any combination of the one or more characteristics respectively defining the stored acoustic signatures is associated with a current software and/or firmware version of a respective non-provisioned device (e.g., distinct acoustic signatures for different firmware versions of the same non-provisioned device).

In some implementations, each of the stored acoustic signatures is associated with a respective reference distance (i.e., a distance from a respective non-provisioned device at which a respective acoustic signal, generated by physical motion of associated tags and characterized by a respective acoustic signature, would be detected). In some implementations, each of the stored acoustic signatures is associated a respective sensor device (e.g., stored acoustic signatures are acoustic signatures of acoustic signals that would be detected using a particular sensor device).

Identifying a Non provisioned Device and Executable Instructions

A first acoustic signal characterized by a respective acoustic signature and generated by a first one of the passive tags is detected (1414). For example, an acoustic signal 1006-4 in FIG. 12A is detected in response to the user opening the product packaging 1008 of a non-provisioned device (e.g., a camera 118). In some implementations, the first acoustic signal is detected by the computer system (e.g., a thermostat 102 equipped with an acoustic sensor), and/or by the one or more sensor devices communicably coupled to the computer system (e.g., camera 118, equipped with an acoustic sensor and communicably coupled to the thermostat 102). In some implementations, multiple sensor devices detect the first acoustic signal (e.g., camera 118, thermostat 102, and wall plug 110, FIG. 10).

Referring now to FIG. 14B, in response to detecting the first acoustic signal (1416), based on the respective acoustic signature (e.g., acoustic signature 1014, FIG. 12A) and information in the database (e.g., table 1200, FIG. 12B), a first one of the non-provisioned devices associated with the respective acoustic signature is identified (1418), and a first one of the respective sets of executable instructions for provisioning the first non-provisioned device is identified (1424).

In some implementations, identifying the first non-provisioned device and identifying the first set of executable instructions comprises (steps 1420, 1426) comparing one or more respective characteristics (e.g., acoustic signature length, amplitude values, spectral coefficients, etc.) of the respective acoustic signature of the first acoustic signal with one or more respective characteristics of one or more of the stored acoustic signatures from the database. A matching acoustic signature that satisfies a match criterion is identified (steps 1422, 1428) from the one or more stored acoustic signatures from the database, wherein the matching acoustic signature is associated with the first non-provisioned device and the first set of executable instructions. For example, referring to FIG. 12A, the acoustic signature 1014 (of an acoustic signal 1006-4 generated by the tags 1010-5 through 1010-7 when torn from the product packaging 1008) is defined by an acoustic signature length L1, amplitude values expressed by function $a1(t)$, and spectral coefficients $F1(\omega)$. One or more of these characteristics are then compared to the entries of the table 1200 in FIG. 12B. Given the match between characteristics of the acoustic signature 1014 and values of entry 1, the non-provisioned device is identified as a camera device, specifically Model A made by Manufacturer A. Furthermore, instructions to register the non-provisioned device with a home system (e.g., smart home environment 100) are also identified.

In some implementations, the match criterion specifies one or more thresholds for one or more respective characteristics of acoustic signatures. Various implementations of the match criterion and specified thresholds, which represent a similarity requirement between the acoustic signature of a detected signal and the stored signatures in the database being compared against, are described in greater detail with respect to the method 1300 in FIG. 13B.

To account for natural variations in the physical motion or force used with respect to tags, a compensated acoustic signature is sometimes used for identifying the non-provisioned device and corresponding instructions. That is, in some implementations, a compensated acoustic signature for the first acoustic signal is obtained by scaling (e.g., shrinking/expanding) a respective acoustic signature length (and optionally amplitude values, and/or spectral coefficients) of the first acoustic signal to match at least a first acoustic signature length defining a first one of the stored acoustic signatures in the database. Identifying (1418) the first non-provisioned object and identifying (1424) the first set of executable instructions are then performed based on the compensated acoustic signature and the information in the database.

Compensated acoustic signatures may also be used when acoustic signals are detected at significantly greater or shorter distances from the non-provisioned device in comparison to the reference distances of the stored acoustic signatures. Particularly, in some implementations, a compensated acoustic signature for the first acoustic signal is obtained by scaling one or more characteristics (e.g., amplitude values) of the respective acoustic signature in accordance with a distance between the respective sensor and the first passive tag that generated the first acoustic signal. Identifying (1418) the first non-provisioned object and identifying (1424) the first set of executable instructions are then performed based on the compensated acoustic signature and the information in the database. To scale characteristics of an acoustic signature, a respective scaling coefficient is first calculated for each sensor device with respect to stored entries of the database. Scaling coefficients are calculated using a non-linear equation (e.g., inverse square law, assuming no reflections or reverberation) that accounts for a difference between a reference distance dref for an acoustic signature (i.e., a distance from a non-provisioned device at which corresponding characteristic values for the acoustic signature would be detected) and a distance dsensor of the sensor device from the tag generating the acoustic signal. For amplitude values measured in units of sound pressure, the scaling coefficient is defined as (dref/dsensor), whereas for sound intensity, the scaling coefficient is defined as (dref dsensor)2. Using calculated scaling coefficients, characteristics of an acoustic signature for a detected acoustic signal are either amplified or shrunk to generate the compensated acoustic signature.

In addition to characteristics of the acoustic signature of the detected acoustic signal, supplementary information may be used for identifying the first non-provisioned device and identifying the first set of executable instructions. That is, in some implementations, identifying (1418) the first non-provisioned object and identifying (1424) the first set of executable instructions is further based on one or more additional inputs received from the one or more sensor devices communicably coupled to the computer system (or received from other devices distinct from the one or more sensor devices). In some implementations, the one or more additional inputs are associated with a time at which the first acoustic signal is detected. In some implementations, the one or more additional inputs are retrieved from (or transmitted by) the one or more sensor devices in response to detecting the first acoustic signal.

In some implementations, the one or more sensor devices include a camera device (e.g., camera 118), and the one or more additional inputs include video data associated with the detected first acoustic signal (e.g., in FIG. 10, using camera 118 to capture images/video data indicating and confirming that a tag is removed from a product packaging 1008). In some implementations, the one or more additional inputs include a user input confirming the first non-provisioned device and the first set of executable instructions. For example, in response to detecting the first acoustic signal, a user is prompted with message on a display interface (e.g., of a nearby device, such as thermostat 102 in FIG. 10) requesting confirmation of the first non-provisioned device and the first set of executable instructions (e.g., confirming that installation of a new camera device is commencing).

Executable Instructions for Provisioning Devices

Referring now to FIG. 14C, in some implementations, the first set of executable instructions includes (1430) instructions for executing installation software (e.g., entry 5 of the table 1200, FIG. 12B). In some implementations, the installation software is stored in the memory of the first non-provisioned device or computer system.

In some implementations, the first set of executable instructions includes (1432) instructions for registering the first non-provisioned device with the computer system (e.g., entries 1 and 2 of the table 1200, FIG. 12B). Registering the first non-provisioned device may include providing a device identifier (or other device information) of the first non-provisioned device to a device or service (e.g., a device of a smart home environment 100, FIG. 10; smart home provider server system 164; etc.) that maintains a database of connected devices of a smart home environment.

In some implementations, the first set of executable instructions includes (1434) instructions for commencing a pairing operation to establish a communications channel between the computer system (or one or more other communicably connected devices) and the first non-provisioned device (e.g., entry 3 of the table 1200, FIG. 12B). Communications channels may be based on one or more communications protocols common to the first non-provisioned device and the computer system, or other communicably connected devices with which the first non-provisioned device is to be paired (e.g., wireless protocols, such as IEEE 802.15.4, Wi-Fi, ZigBee, 6LoWPAN, Thread, Z-Wave, Bluetooth Smart, ISA100.11a, WirelessHART, MiWi, etc.).

In some implementations, in response to establishing the communications channel between the computer system and the non-provisioned device (by causing execution of the first set of instructions, step 1434), the computer system causes execution of a second set of executable instructions corresponding to a subsequent stage in the software process. For example, data (e.g., information used for device registration) is exchanged between the computer system and the non-provisioned device, and subsequent stages of an installation process commence, after a communications channel has been established.

In some implementations, the first set of executable instructions includes (1436) instructions for determining, based on the respective acoustic signature and information in the database, whether a respective software (or firmware) version of the first non-provisioned device is outdated, and commencing a software update process in accordance with a determination that the respective software (or firmware) version of the first non-provisioned device is outdated (e.g., entry 4 of the table 1200, FIG. 12B). For example, the acoustic signature of a detect acoustic signal may both indicate a version of software installed on the first non-provisioned device, and may also correspond to instructions to check that the software version of the first non-provisioned device is up-to-date (e.g., by comparing the software version indicated by the acoustic signature against a retrieved database). If the software version is outdated, a software update process is initiated (e.g., by downloading, transmitting, and/or executing installation files).

In some implementations, after identifying (step 1424) and prior to causing (step 1440) execution of the first set of executable instructions, the identified first set of executable instructions is downloaded (1438) from a remote server. For example, if the first set of executable instructions corresponds to instructions to execute installation software, but the installation software is not stored locally, the installation software is downloaded from a remote server (e.g., by the first non-provisioned device and/or the computer system).

After identifying the first non-provisioned device and the first set of executable instructions, the computer system causes execution (1440) of the first set of executable instructions, thereby causing to commence a software process for provisioning the first non-provisioned device. In some implementations, causing execution of the first set of executable instructions comprises (1442) executing the first set of executable instructions on the computer system (e.g., in provisioning a new camera device with a thermostat 102 in FIG. 10, the thermostat 102 executes the first set of instructions). Additionally and/or alternatively, causing the execution of the first set of executable instructions comprises (1442) sending a command to the first non-provisioned device, wherein the command causes the first non-provisioned device to execute the first set of executable instructions (e.g., in FIG. 10, a command is sent by the thermostat 102 to a camera device to be provisioned, triggering the camera device to execute installation files stored in its memory).

Other Implementations of Tags and Acoustic Signals

Acoustic tags may also be used in the context of inventory tracking within an environment. For example, using acoustic tags to generate acoustic signals having predefined acoustic signatures, various inventory statistics for goods may be monitored. Characteristics of an acoustic signature of an acoustic signal may be predefined for identifying qualities of a product, such as a product brand, type/category (e.g., milk, vegetable, detergent), etc. In some cases, a user may tear a tag from a new product (e.g., a cereal box) that is being introduced into the household, where the acoustic signal generated by the tag has a corresponding acoustic signature for incrementing a count for a given product (e.g., acoustic signature corresponding to instructions to increment a count in a database for a particular product). Similarly, a separate (or the same tag) may be torn when the product has been fully consumed or used, where a generated acoustic signal has a corresponding acoustic signature for decrementing a count for the product (e.g., acoustic signature corresponding to instructions to decrement a count in a database). In this case, an optional alert may also be generated and provided to the user as a reminder to replenish the inventory. As an additional feature, upon tearing the tag when a product has been fully consumed, the acoustic signature may also be associated with executable instructions or script for automatically placing an order for the product (e.g., through an online merchant). As another example, tags of a product may also be used to alert a user as to an expiration of a product. For example, a first tag may be torn when a food product is first introduced to inventory, and a second tag may be torn each time a user consumes the food product. Whether the food product has expired may then be determined by comparing corresponding timestamps for acoustic signals generated by the physical movement of the first and second tags (e.g., if time difference between acoustic signals for first and second tags exceeds a threshold, user is alerted as to potential expiration of the food product).

It should be understood that the particular order in which the operations in FIGS. 13A-13C and 14A-14C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein are also applicable in an analogous manner to the methods 1300 and 1400 described above with respect to FIGS. 13A-13C and 14A-14C, respectively.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method of detecting a state of monitored objects in a premises, comprising:
    at a computer system having one or more processors and memory storing instructions for execution by the one or more processors, wherein the computer system is communicatively coupled to one or more sensor devices:
        receiving and processing information of acoustic signals against a database of stored acoustic signatures characterizing predefined acoustic signals generated by electrically non-powered passive tags in response to physical motion of respective monitored objects associated with the passive tags;
        receiving a first acoustic signal characterized by a first acoustic signature and generated by a first passive tag of the passive tags in response to physical motion of a first monitored object of the respective monitored objects, wherein the first monitored object is associated with the first passive tag; and
        in response to the receiving:

based on the first acoustic signature and information in the database:
  identifying the first monitored object associated with the first acoustic signature;
  determining a first state of a plurality of predefined states of the first monitored object; and
  providing at least one of:
    an indication of the first state to an application on a device associated with the first monitored object;
    the indication of the first state to a smart home server system associated with the first monitored; or
    a command to an additional monitored object of the respective monitored objects to enable the additional monitored object to perform an action in response to the first state.

2. The method of claim 1, wherein the additional monitored object is a video surveillance camera and the command to enable the additional monitored object to perform the action in response to the first state causes the video surveillance camera to begin capturing video.

3. The method of claim 1, wherein each predefined state of the plurality of predefined states is based on one or more previous acoustic signals having respective acoustic signatures.

4. The method of claim 3, wherein the one or more previous acoustic signals having respective acoustic signatures comprises:
  a collection of respective acoustic signals collected by at least two of the one or more sensor devices; or
  a collection of two or more acoustic signals collected by a single sensor device of the one or more sensor devices.

5. The method of claim 1, wherein:
  the passive tags comprise an adhesive material with a corresponding degree of adhesiveness; and
  the adhesive material produces an acoustic signal having a particular acoustic signature in response to physical contact.

6. The method of claim 1, further comprising storing in the database the determined first state of the first monitored object.

7. The method of claim 6, wherein:
  the storing comprises updating a current state of the first monitored object from a previously stored state to the first state; and
  the first state and the previously stored state represent distinct states of the first monitored object.

8. The method of claim 7, further comprising:
  detecting a second acoustic signal having a second acoustic signature generated by the first passive tag;
  in response to detecting the second acoustic signal, and based on the second acoustic signature and the information in the database, identifying the first monitored object associated with the second acoustic signature; and
  requesting, to the device associated with the first monitored object, authorization to associate the second acoustic signature with the first monitored object and a respective state corresponding to the second acoustic signature.

9. The method of claim 8, further comprising:
  in response to receiving, from the device associated with the first monitored object, the authorization to associate the second acoustic signature with the first monitored object and the respective state corresponding to the second acoustic signature, storing in the database the respective state corresponding to the second acoustic signature of the first monitored object.

10. The method of claim 9, wherein the authorization includes a user input confirming the respective state corresponding to second acoustic signature of the first monitored object.

11. A non-transitory computer-readable storage medium storing one or more programs for execution by one or more processors of a computer system, the one or more programs comprising instructions for:
  receiving and processing information of acoustic signals against a database of stored acoustic signatures characterizing predefined acoustic signals generated by electrically non-powered passive tags in response to physical motion of respective monitored objects associated with the passive tags;
  receiving a first acoustic signal characterized by a first acoustic signature and generated by a first passive tag of the passive tags in response to physical motion of a first monitored object of the respective monitored objects, wherein the first monitored object is associated with the first passive tag; and
  in response to the receiving:
    based on the first acoustic signature and information in the database:
      identifying the first monitored object associated with the first acoustic signature;
      determining a first state of a plurality of predefined states of the first monitored object; and
      providing at least one of:
        an indication of the first state to an application on a device associated with the first monitored object;
        the indication of the first state to a smart home server system associated with the first monitored; or
        a command to an additional monitored object of the respective monitored objects to enable the additional monitored object to perform an action in response to the first state.

12. The non-transitory computer readable storage medium of claim 11, wherein the additional monitored object is a video surveillance camera and the command to enable the additional monitored object to perform the action in response to the first state causes the video surveillance camera to begin capturing video.

13. The non-transitory computer readable storage medium of claim 11, wherein each of the plurality of predefined states are based on one or more previous acoustic signals having respective acoustic signatures.

14. The non-transitory computer readable storage medium of claim 11, wherein the one or more programs further comprise instructions for storing in the database the determined first state of the first monitored object.

15. The non-transitory computer readable storage medium of claim 14, wherein the storing comprises updating a current state of the first monitored object from a previously stored state to the first state,
  wherein the first state and the previously stored state represent distinct states of the first monitored object.

16. The non-transitory computer readable storage medium of claim 15, wherein the one or more programs further comprise instructions for:
  detecting a second acoustic signal having a second acoustic signature generated by the first passive tag;

in response to detecting the second acoustic signal, and based on the second acoustic signature and the information in the database, identifying the first monitored object associated with the second acoustic signature; and requesting, to the device associated with the first monitored object, authorization to associate the second acoustic signature with the first monitored object and a respective state corresponding to the second acoustic signature.

17. The non-transitory computer readable storage medium of claim 16, wherein the one or more programs further comprise instructions for:

in response to receiving, from the device associated with the first monitored object, the authorization to associate the second acoustic signature with the first monitored object and the respective state corresponding to the second acoustic signature, storing in the database the respective state corresponding to the second acoustic signature of the first monitored object.

18. A system comprising:

a processor;

an acoustic sensing device; and a first electrically non-powered passive tag, wherein:

the first electrically non-powered passive tag is associated with a first monitored object;

the first monitored object includes a plurality of predefined states;

the first electrically non-powered passive tag generates a first acoustic signal characterized by a first acoustic signature in response to physical motion of the first monitored object;

the acoustic sensing device is configured to receive the first acoustic signal; and the processor is configured to, based on the first acoustic signal received by the acoustic sensing device, determine a first state of the plurality of predefined states of the first monitored object.

19. The system of claim 18, wherein the system is communicatively coupled to:

an application on a device associated with the first monitored object a smart home server system associated with the first monitored object; or the additional monitored object of the respective monitored objects.

20. The system of claim 18, wherein the first electrically non-powered passive tag comprises an adhesive material with a corresponding degree of adhesiveness, the adhesive material producing an acoustic signal having a particular acoustic signature in response to physical contact.

* * * * *